United States Patent
Balasubramanian et al.

(10) Patent No.: US 12,476,774 B2
(45) Date of Patent: Nov. 18, 2025

(54) METHOD AND APPARATUS FOR USING A PROBE UE TO MEASURE INTERFERENCE USING DYNAMIC TIME DIVISION DUPLEX (TDD) CONFIGURATION

(71) Applicant: Celona, Inc., Campbell, CA (US)

(72) Inventors: Srinivasan Balasubramanian, San Diego, CA (US); Sushanth Chandappa Kulal, Campbell, CA (US)

(73) Assignee: CELONA, INC., Campbell, CA (US)

( * ) Notice: Subject to any disclaimer, the term of this patent is extended or adjusted under 35 U.S.C. 154(b) by 324 days.

(21) Appl. No.: 18/164,059

(22) Filed: Feb. 3, 2023

(65) Prior Publication Data
US 2023/0254103 A1    Aug. 10, 2023

Related U.S. Application Data

(60) Provisional application No. 63/307,507, filed on Feb. 7, 2022.

(51) Int. Cl.
*H04L 5/14*     (2006.01)
*H04B 17/336*   (2015.01)

(52) U.S. Cl.
CPC ......... *H04L 5/1469* (2013.01); *H04B 17/336* (2015.01)

(58) Field of Classification Search
CPC .................................................... H04L 5/1469
See application file for complete search history.

(56) References Cited

U.S. PATENT DOCUMENTS

| | | | | |
|---|---|---|---|---|
| 2013/0102309 A1* | 4/2013 | Chande | ............... | H04W 52/325 |
| | | | | 455/435.1 |
| 2014/0301251 A1* | 10/2014 | Chen | ................... | H04W 72/541 |
| | | | | 370/278 |
| 2015/0078220 A1* | 3/2015 | Hu | ............................. | H04J 3/00 |
| | | | | 370/280 |
| 2015/0215069 A1* | 7/2015 | Lin | ....................... | H04L 1/0015 |
| | | | | 370/329 |
| 2016/0191186 A1* | 6/2016 | Liu | ..................... | H04W 56/001 |
| | | | | 370/280 |
| 2021/0175992 A1* | 6/2021 | Yavuz | .................... | H04W 24/10 |
| 2021/0185693 A1* | 6/2021 | Takeda | ............. | H04W 72/0446 |
| 2023/0095424 A1* | 3/2023 | Gurney | ............. | H04W 72/0446 |
| | | | | 370/252 |

(Continued)

*Primary Examiner* — Zhiren Qin
(74) *Attorney, Agent, or Firm* — Jaquez Land Greenhaus & McFarland, LLP; Bruce W. Greenhaus

(57) ABSTRACT

A probe device and method for measuring TDD interference from neighboring networks in an Enterprise Network (EN). The probe device is situated on a campus of an EN in a position for measuring TDD interference between a neighboring wireless network. The probe device measures TDD interference data and provides it to an Enterprise Network and Orchestrator, which determines the TDD configuration used by neighboring networks, and can take action to mitigate or resolve interference effects from neighboring networks. The probe UE has a TDD measurement unit that may include an SIB Measurement unit for receiving broadcast SIBs signals from neighboring networks, a UL SINR Measurement Unit, a DL SINR Measurement Unit, and a UL RSSI Measurement Unit. The probe device may be positioned in a fixed location in an Enterprise Network campus, and connected to an external power supply.

19 Claims, 19 Drawing Sheets

(56) References Cited

U.S. PATENT DOCUMENTS

2023/0127705 A1* 4/2023 Ozturk ................. H04W 76/15
370/329
2024/0243887 A1* 7/2024 Murayama ............ H04L 5/0064

* cited by examiner

EutraTddConfig Object Definition

| Property | M/O | Permitted Values/Restrictions |
|---|---|---|
| NAME: tddConfig DATA TYPE: enum | Required | Permitted values are 0, 1, 2, 3, 4, 5, and 6. This parameter represents either E-UTRA TDD UL/DL configuration [4] or the corresponding NR TDD Equivalent Configurations. In the case of the fallbackTddConfig, permitted values are restricted as per Table 1 (see section 5.1.2 for more details). |
| NAME: specialSubframeConfig DATA TYPE: enum | Required | Permitted values are 0, 1, 2, 3, 4, 5, 6, 7, 8, 9, and 10. This parameter represents EUTRA TDD special subframe configuration [4] and can may also be adapted by NR TDD CBSDs to ensure an NR TDD Equivalent Configuration. In the case of the fallbackTddConfig, permitted value is 7 (see section 5.1.2 for more details)⁴. |

NrTddConfig Definition

| Attribute | S/O/C | Permitted Information |
|---|---|---|
| frequency | Required | NR subcarrier spacing in kHz. The permitted values are "kHz15" and "kHz30", representing 15 kHz and 30 kHz subcarrier spacing, respectively. |
| ldTddULDLPatt ern1 (NrTddUL-DLPattern) | Required | NR TDD UL-DL Pattern, similar to the one defined in [20] (section describing TDD-UL-DL-Config information element) |
| ldTddULDLPatt ern2 (NrTddUL-DLPattern) | Optional | NR TDD UL-DL Pattern, similar to the one defined in [20] (section describing TDD-UL-DL-Config information element) |

FIG. 3D (Prior Art)

NrTddUlDlPattern Definition

| Elements | M/O/C | Descriptive Information |
|---|---|---|
| *dlUlTransmissionPeriodicity* DEFAULT THIS ATTRIBUTE | Required | Periodicity of the DL-UL pattern in milliseconds. Permitted values are "ms0p5", "ms1", "ms2", "ms2p5", "ms3", "ms4", "ms5", "ms10". |
| *nrofDownlinkSlots* DEFAULT THIS ATTRIBUTE | Required | Number of consecutive full DL slots at the beginning of each DL-UL pattern. Maximum value is 20. This parameter is an integer number. |
| *nrofDownlinkSymbols* DEFAULT THIS ATTRIBUTE | Required | Number of consecutive DL symbols in the beginning of the slot following the last full DL slot (as derived from nrofDownlinkSlots). The value 0 indicates that there is no partial-downlink slot. The symbols after the last DL symbol and before the first UL symbol, are considered to be guard symbols with no UL or DL signal being transmitted. The maximum number of symbols in a slot is 14. This parameter is an integer number. |
| *nrofUplinkSlots* DEFAULT THIS ATTRIBUTE | Required | Number of consecutive full UL slots at the end of each DL-UL pattern. Maximum value is 20. This parameter is an integer number. |
| *nrofUplinkSymbols* DEFAULT THIS ATTRIBUTE | Required | Number of consecutive UL symbols in the end of the slot preceding the first full UL slot (as derived from nrofUplinkSlots). The value 0 indicates that there is no partial-uplink slot. The maximum number of symbols in a slot is 14. The symbols after the last DL symbol and before the first UL symbol, are considered to be guard symbols with no UL or DL signal being transmitted. This parameter is an integer number. |

FIG. 3E (Prior Art)

METHOD AND APPARATUS FOR USING A PROBE UE TO MEASURE INTERFERENCE USING DYNAMIC TIME DIVISION DUPLEX (TDD) CONFIGURATION

PRIORITY CLAIM

Reference is made, and priority is hereby claimed to U.S. Provisional Patent Application No. 63/307,507 filed Feb. 7, 2022, entitled Dynamic Time Division Duplex (TDD) Configuration in a Citizens Broadband Radio Service (CBRS) Network, which is incorporated herein by reference in its entirety.

BACKGROUND

Technical Field

The disclosed method and apparatus relate generally to wireless communications networks and more particularly to systems for mitigating interference by coordinating spectrum allocated to user devices in the wireless network.

Background

The wireless industry has experienced tremendous growth in recent years, with rapidly improving technology, and faster and more numerous broadband communication networks are being installed around the globe. Wireless networks have now become key components of a worldwide communication system that connects people and businesses at speeds and on a scale unimaginable just a couple of decades ago.

In wireless networks, multiple mobile devices are served voice services, data services, and many other services over wireless connections. So, they may remain mobile while still connected.

Communication Network Configurations

FIG. 1 is an illustration of a basic configuration for a communication network 100, such as a "4G LTE" (fourth generation Long-Term Evolution) or "5G NR" (fifth generation New Radio) network. Through this network configuration, user equipment (UE) 101 can connect to External Packet Data Networks (PDNs) 103 and access any of a variety of services such as the Internet, Application Servers, Data Services, Voice Services, and others.

UEs, BS/APs, RAN

"UEs", or "devices", or "UE devices" can be used to refer to a wide range of user devices having wireless connectivity, such as a cellular mobile phone, an Internet of Things (IOT) device, virtual reality goggles, robotic devices, autonomous driving machines, smart barcode scanners, and communications equipment including desktop computers, laptop computers, tablets, and other types of personal communications devices. In the illustration of FIG. 1, the UEs 101 include a first mobile phone 101a, a second mobile phone 101b, a laptop computer 101c (which is portable), and a printer 101d (typically situated at a fixed location).

The UEs 101 connect wirelessly over radio communication links 105 to a Radio Access Network (RAN) 107 that typically includes multiple base station/access points (BS/APs) 109. One of the advantages of such wireless networks is their ability to provide communications to and from multiple wireless devices and provide these wireless devices with access to a large number of other devices and services even though the devices may be mobile and moving from location to location.

The term 'BS/AP" is used herein to include Base Stations and Access Points. The BS/APs may include an evolved NodeB (eNB) of an LTE network or gNodeB of a 5G network, a cellular base station (BS), a Citizens Broadband Radio Service Device (CBSD) (which may be an LTE or 5G device), a Wi-Fi access node, a Local Area Network (LAN) access point, and a Wide Area Network (WAN) access point.

Core Network

The RAN 107 connects the UEs 101 with the Core Network 111, which provides an interface between the RAN 107 and other networks. The Core Network can have multiple functions; in one important function, the Core Network 111 provides access to other devices and services either within its network, or on other networks such as the External PDNs 103. Particularly, the UEs 101 are wirelessly connected to the BS/APs 109 in RAN 107, and the RAN 107 is coupled to the Core Network 111 utilizing any appropriate communication means, such as wireless, cable, and fiber optic. Thus, the RAN 107 and the Core Network 111 provide a system that allows information to flow between a UE in the cellular or private network and other networks, such as the Public Switched Telephone Network (PSTN) or the Internet.

In addition to providing access to remote networks and allowing information to flow between the cellular network and the external PDNs 103, the Core Network 111 includes RAN Control Units 113 that manage the wireless network and provide control of the air interface between the BS/AP 119 and the UEs 101. The Core Network 111 may also coordinate the BS/APs 109 to minimize interference within the network.

CBRS Networks

One type of wireless network that recently became available for general use by enterprise locations is a Citizen's Broadband Radio Service (CBRS) network, which utilizes the CBRS radio band of 3550-3700 MHz, nominally divided into fifteen channels of 10 MHz each. Particularly, the US Federal Government recently approved use of the CBRS band of the frequency spectrum and finalized rules (Rule 96) that allow general access to the CBRS band. The CBRS rules set forth detailed requirements for the devices that operate in a CBRS network and how they communicate. CBRS supports both LTE and 5G devices. CBRS provides enormous wireless networking power to organizations that have never had such an option before and opens up and creates opportunities for a range of new applications.

FIG. 2 is a diagram of an example of a CBRS wireless communication network 200. In FIG. 2, a plurality of BS/APs 202 are deployed within a location 203 on the enterprise's campus, providing service to a plurality of UEs 204.

In FIG. 2, each BS/AP 202 has a range that represents its respective wireless coverage. A first UE 202a is wirelessly connected to a first BS/AP 204a, which is providing service to it. A second UE 204b is wirelessly connected to a second BS/AP 202b and is providing service to that second UE 204b. Other UEs 204 connect to their respective BS/APs, for example third UE 204c, fourth UE 204d, fifth UE 204e, sixth UE 204f, and seventh UE 204g are shown in the enterprise location 203. All the BS/APs are connected to an operator Core Network 222 by any appropriate communication means, such as wire, fiber optic, wireless radio and/or a PDN 220. The operator Core Network 222 includes components such as an OAM Server 207, a SON assist unit 208, a Domain Proxy 209, an Automatic Configuration Server (ACS) 210, a Location Database 211, and other databases 212, all of which are connected to each other within the operator Core Network 222 by any appropriate means.

Base stations (BS/APs) within a CBRS network are termed "CBSDs", and UEs are termed End User Devices (EUDs). CBSDs are fixed Stations, or networks of such stations, that operate on a Priority Access License (PAL) or General Authorized Access (GAA) basis in the CBRS consistent with Title 47 CFR Part 96 of the United States Code of Federal Regulations (CFR).

SAS

The Operator Core Network 222 is connected to a Spectrum Access System (SAS) 232, which is connected to a Spectrum Database 233 that includes data regarding the spectrum that it is managing. Collectively, the SAS 232 and the Spectrum Database 233 are referred to as a Spectrum Management Entity (SME) 234. The SAS 232 provides a service, typically cloud-based, that manages the spectrum used in wireless communications of devices transmitting in the CBRS band in order to prevent harmful interference to higher priority users, such as the military and priority licensees. The CBRS rules require that the SAS 232 allocate spectrum to the CBSDs to avoid interference within the CBRS band. To allocate spectrum and maintain communication between the CBSDs and the SAS 232, a series of messages are exchanged for purposes including registration, spectrum inquiry, grant, and heartbeat response. In a RAN that has multiple CBSDs, the Domain Proxy (DP) 209 may be implemented to communicate with the SAS and manage all transactions between the CBSDs and the SAS 232. The Spectrum Sharing Committee Work Group 3 (for CBRS Protocols) has established an interface specification for registering a CBSD with an SAS 232, requesting a grant of spectrum, and maintaining that grant. These message flows are described in the document titled "Signaling Protocols and Procedures for Citizens Broadband Radio Service (CBRS): Spectrum Access System (SAS)—Citizens Broadband Radio Service Device (CBSD) Interface Technical Specification", Document WINNF-TS-0016-V1.2.4, 26 Jun. 2019. A CBRS device (CBSD) needs authorization from the SAS before starting to transmit in the CBRS band. Even after authorization, the SAS may suspend or terminate authorization of one or more the channels previously authorized. PAL CBSDs (i.e., CBSDs that operate under a PAL) have higher priority to access the available CBRS spectrum than do GAA CBSDs.

TDD and the Co-Existence Manager

The CBRS Alliance (CBRSA) is a standards group for CBRS wireless communication systems. The CBRSA requires that each deployment select a TDD configuration for the CBSDS in the deployment. The CBSDs (and/or the DP) vote to select a TDD configuration with a CxM (the coexistence manager). FIG. 2 shows a CxM 240 connected to the operator core network 222 and an SAS 232 In some embodiments the CxM will be integrated and supported with SAS implementations. Together the CxM and the SAS may be called the CSAS.

The CBSDs vote for a TDD config. TDD config selection occurs only amongst GAA CBSDs. PAL co-existence is addressed in Point Release 4.1.

The main use focus is on TDD Configs 1 and 2. Generally, config 2 is selected for DL-centric (Download-centric) deployments, whereas config 1 is selected for UL-centric (Upload-centric) deployments. Both LTE (4G) and NR (5G) utilize TDD configs, and therefore, they must be selected. Furthermore, LTE deployments will need to contend with neighboring NR deployments and vice versa. For outdoor CBSDs, aligning 1) cell phases and 2) TDD Configurations is a requirement. For indoor CBSDs, power levels are comparable to UE power levels, and the restriction on utilizing the same TDD Configuration may be relaxed.

All LTE-TDD CBSDs and NR-TDD CBSDs that are part of the same TDD Configuration Connected Set (TCCS) will use the same TDD Configuration or Equivalent TDD Configurations, when requested by the CxM. Any LTE-TDD Configuration or the NR Equivalent TDD Configuration may be used, provided all the LTE-TDD and NR-TDD CBSDs in the TDD Configuration Connected Set use the same TDD Configuration or Equivalent TDD Configurations.

FIGS. 3A to 3E are tables that show definitions relating to TDD configurations for 4G and 5G communications. For 4G, FIG. 3A shows LTE TDD configurations and FIG. 3B shows EutraTddConfigObject Definitions. The subframes 0-9 shown in FIG. 3A indicate whether Uplink (U) or Downlink (D) communications are allowed in the slot. A slot is used by scheduling mechanisms as a unit of transmission, and in this case (FIG. 3A), each subframe can be considered to be a slot.

For NR (5G) FIG. 3C shows NR TDD configurations, FIG. 3D shows NrTddConfig Definitions, and FIG. 3E shows NrTDDUIDlPattern Definitions. FIG. 3C shows an example of slot configurations for a 30 kHz spacing. A slot is used by scheduling mechanisms as a unit of transmission of OFDM symbols.

TDD Configuration Selection Procedure

The following message exchanges are defined between the CxM and a CBSD or DP. These messages are being defined in standards.

For a Request from a CBSD/DP to the CxM some messages are:
  desiredTddConfig;
  desiredNrTddConfig;
  usedTddConfig;
  usedNrTddConfig;
  fallbackTddConfig; and
  indoorCbsdOptOut.

For a response from a CxM to the CBSD, some messages are:
  eutraTddConfig;
  nrTddConfig;
  coexMeasAssist; and
  cbsdFrequencyGuidance.

In order to select a TDD configuration by a CBSD or DP (CBSD/DP), voting procedures are utilized, and may be defined in standards. If LTE-TDD and NR-TDD CBSDs belonging to the same TDD Configuration Connected Set (TCCS) select different TDD Configurations, the CxM designate the use of one of the mandatory TDD Configurations. In a TCCS containing only NR-TDD CBSDs, an NR-TDD Configuration not compatible with LTE-TDD may be used, provided that all NR-TDD CBSDs in the TCCS use the same or Equivalent TDD Configuration. The TCCS that the CxM constructs can be different from the Channel Assignment Connected Sets. For example, these Connected Sets can be different in the case where indoor CBSDs opt out of the TCCS.

In order to select a TDD configuration in a TCCS, the following procedures may be used. If all the CBSDs in the TDD Configuration Connected Set specify the same desired TDD Configuration including the SSF (Special SubFrame) selection (the desired TDD Configuration may be outside of the set of mandatory TDD Configurations), then the desired TDD Configuration becomes the TDD Configuration to be used in that TDD Configuration Connected Set. Otherwise, the fallback TDD configuration is to be chosen by majority voting among the fallback TDD Configurations specified by CBSDs within the constructed baseline TDD Configuration Connected Set.

An Indoor CBSD can opt out. The standards provide that the CxM shall request Indoor CBSDs to employ the mandatory TDD Configurations only when harmful interference scenarios originated by the Indoor CBSDs are reported. Also, the CxM shall consider fallback TDD preferences of Indoor CBSDs that have requested to opt out, if these CBSDs are going to be mandated a TDD Configuration.

For a NR (5G) CBSD, the CBSD may specify the desired NR-TDD Configuration including an SSF selection that is not compatible with LTE-TDD Configurations to the CxM. The standard provides that if all the CBSDs in a TCCS specify the same or Equivalent NR-TDD Configuration, then the CxM shall allow that NR-TDD Configuration to be used.

The TCCS is determined by the CxM. The CxM responds to the CBSD/DP, providing the TDD configuration to use, whether the CBSD/DP is LTE or NR. The CxM provides information to the CBSD as assistance information for coexistence measurements. The CxM provides CBSD frequency guidance; particularly, the CxM provides guidance on the frequency range(s) the CBRSA CxG CBSD is instructed to request and use going forward. Upon receiving this information, the CBRSA CxG CBSD is expected to only request and hold spectrum grants that are within the received cbsdFrequencyGuidance. In a scenario in which the guidance last received from the SpectrumInquiryResponse→availableChannel object is in conflict with the last received cbsdFrequencyGuidance, the CBSD should follow the latter for determining the frequencies on which to request spectrum grants.

Regardless of complexities, the CBRS band provides an opportunity to create new wireless networks, and there is a desire for utilizing and making maximum use of spectrum in the CBRS band while following the rules pertaining the CBRS usage, including effectively responding to directions from the SAS.

PAL CBSDs and GAA CBSDs in Independent TCCS's

The standards may evolve to support PAL and GAA in independent TCCS's for TDD config selection. A PAL CBSD can join a GAA TCCS, if desired, and in that case, it is likely that the PAL CBSD(s) will select TDD config 2. However, there are use cases for enterprises where increased UL capacity is required and choice of TDD config 1 may be desirable for the GAA TCCS, although TDD config 2 is being used. In this case just changing one TCCS to TDD config 1 will be problematic as there will be two slots that can face interference (intra/inter/cross-link), which may be harmful. For example, in the LTE (4G) TDD configuration (FIG. 3C) it can be seen that in slot 3, TDD config 2 is downlink (D), and TDD config 1 is uplink (U), which can create interference issues.

This interference issue may not exist at initial deployment and may happen based on subsequent deployment of PAL nodes. It may also vary from time to time dependent upon current network use and the number of UEs operating at a particular time. This issue may indicate problems for indoor/outdoor deployments and CAT-A (1 watt)/CAT-B (50 watt) deployments for example. A mechanism is required to detect and mitigate this issue in the field.

Use of Secondary TDD Configurations

The voting for TDD configuration identifies the 'primary' TDD configuration to be used by the CBSDs in the TCCS. Also, the CBSDs are allowed to use a compatible TDD configuration to the primary TDD configuration—specified as a 'secondary' TDD configuration. This secondary TDD configuration typically has two slots that have the potential for UL/DL mismatches, which can cause interference issues, and therefore if interference is observed using a secondary configuration, as long as no harmful interference is being caused.

Example 1: TDD config #2 allows for TDD config #1.
Example 2: TDD config #1 allows for TDD config #0 or TDD config #2.

If interference is observed and reported to the CSAS (CxM+SAS), the CSAS will require the infringing CBSDs to switch to a 'primary' TDD configuration. Therefore, a mechanism is required to detect interference and mitigate the interference in the deployment.

Varying Interference

Based on the amount of activity in the given network and neighboring network(s), there will be varying interference experienced over time. Interference detection techniques are required for at least some of the following reasons:

Reliably determining the sources of the interference when it happens;
Detection is especially important during known peak hours;
Detection technique can be repeated during off peak hours to detect interference, or absence of interference;
To detect issues with co-channel, inter-frequency, and cross-link interference aspects; and
To detect issues in specific slots of operation.

Knowledge of the deployed network can be useful, for example knowledge of whether the antennas employed are directional antennas or omni-directional antennas can be useful. It would also be useful to detect the network type, such as LTE, NR, or LTE & NR, used in campus deployments and neighbor deployments. It would also be useful to detect whether LTE-compatible TDD configurations or NR-specific TDD configurations are used.

SUMMARY

In order to reduce interference in an Enterprise Network (EN), a probe device for measuring TDD interference in an Enterprise Network (EN) is disclosed that measures TDD interference from neighboring networks. Generally, TDD interference is caused due to mismatched TDD configurations in an RF footprint, and may originate in external (neighboring) networks, or internal sources. A method is also disclosed for determining the TDD configuration used by neighboring networks, and for mitigating interference effects.

Various embodiments are disclosed. The probe device may be situated on a campus of an EN that has a plurality of BS/APs that utilize a first TDD configuration for wireless communications. The probe device is situated in the EN campus in position for measuring TDD interference between a neighboring wireless network, which utilizes a second TDD configuration that may conflict with the first TDD configuration.

The probe device includes a wireless receiver for receiving wireless channels; a communication link with the Enterprise Network; a frequency scanning unit; data storage; and a TDD measurement unit for measuring TDD interference data from the neighboring network, and providing the data to the Enterprise Network over the communication link. The TDD measurement unit may include an SIB (System Information Blocks) Measurement unit for receiving broadcast SIBs signals from neighboring networks, a UL (Upload) SINR (Signal to Interference plus Noise Ratio) Measurement Unit, a DL SINR Measurement Unit, and a UL RSSI (Received Signal Strength Indicator) campus, and connected to an external power supply.

In a disclosed embodiment, the wireless receiver has circuitry for receiving CBRS channels and the frequency scanning unit has circuitry for scanning CBRS channels; in some embodiments, the wireless receiver has circuitry for receiving signals in adjacent bands, such as mid-band signals and C-band signals. The probe device may be a CBSD that has a built-in UE, such as a CAT-A CBSD. The probe device may further include software and circuitry for performing RF environment scanning, Network Performance testing, and Radio Performance testing.

A method of detecting interference from a neighboring wireless network using a probe UE is disclosed that includes positioning the probe device in the EN campus where it can receive signals from the neighboring network, receiving signals from the neighboring network in the probe device, and determining the TDD configuration utilized by the neighboring network. Determining the TDD configuration of the neighboring network may include receiving neighbor SIBs (System Information Blocks) from the neighboring network in the probe device. Determining the TDD configuration of the neighboring network may also include measuring communication data in slots where TDD interference can occur between different TDD configurations. In some embodiments, determining the TDD configuration of the neighboring network may comprise measuring the UL SINR of the probe device at the BS/AP (eNB/gNB), including calculating cross-correlation between two slots and determining TDD interference responsive to the cross-correlation. In some embodiments, determining the TDD configuration of the neighboring network may comprise measuring DL SINR in the probe device, including observing the HARQ (Hybrid Automatic Repeat Request) feedback performance. In some embodiments, determining the TDD configuration of the neighboring network may comprise measuring the UL RSSI or RSRP (Reference Signal Received Power) of the probe device at the BS/AP, including comparing the RSSI or RSRP between two slots. DL RSRP (or RSRQ (Reference Signal Received Quality)) measurements can be made at the probe UE to determine if there is cross-link (UL transmission from another UE in the proximity impacting a DL slot at the probe UE) interference seen.

In some embodiments the enterprise wireless network operates on the Citizens Broadband Radio Service (CBRS band), the BS/APs in the RAN comprise CBRS Devices (CBSDs) that are located at a campus location and form part of an enterprise network. In alternative implementations, other network architectures and other technologies, such as mm-wave, or spectrum purchased/licensed from others, could be utilized.

BRIEF DESCRIPTION OF THE DRAWING

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

FIG. 3B is a table that shows EutraTddConfigObject definitions for 4G communication systems.

FIG. 3C is a table that shows NR TDD configurations and slot configurations for a 30-kHz spacing.

FIG. 3D is a table that shows NrTddConfig definitions.

FIG. 3E is a table that shows NrTDDUIDlPattern definitions.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

Communication networks and system components are described herein using terminology and components common to 4G (LTE) communication systems, and/or 5G (NR) communication systems. However, the principles of the communication network and microslices described herein more widely apply to other communication systems, not only to 4G or 5G systems.

(1) Enterprise Network

An implementation of an enterprise wireless communication network (EN) at a campus location is described herein. The term "enterprise" is used herein in its broadest sense to include any organization, such as businesses, research organizations, schools, colleges, hospitals, industry organizations, and any other organization, regardless of whether or not for profit. The term "campus" is used in its broadest sense to include any area in which the enterprise operates, such as the grounds and/or buildings operated or managed by the enterprise, college campuses, research centers, industrial complexes, any business or industrial site, and others.

An enterprise wireless communication network (EN) is a private network. Private networks are operated for use within a limited area by a limited group of authorized users, whereas public networks generally cover a larger area and are open for use by anyone that subscribes to the service by the network operator. One or more ENs can be created at a location such as a warehouse, factory, research center or other building, and are usually operated by an organization for its own use. Other types of private networks may be operated by a private network manager for use by more than one organization. Although described in the context of an enterprise wireless communication network, the principles disclosed can also apply to any private wireless network.

Figure 1:
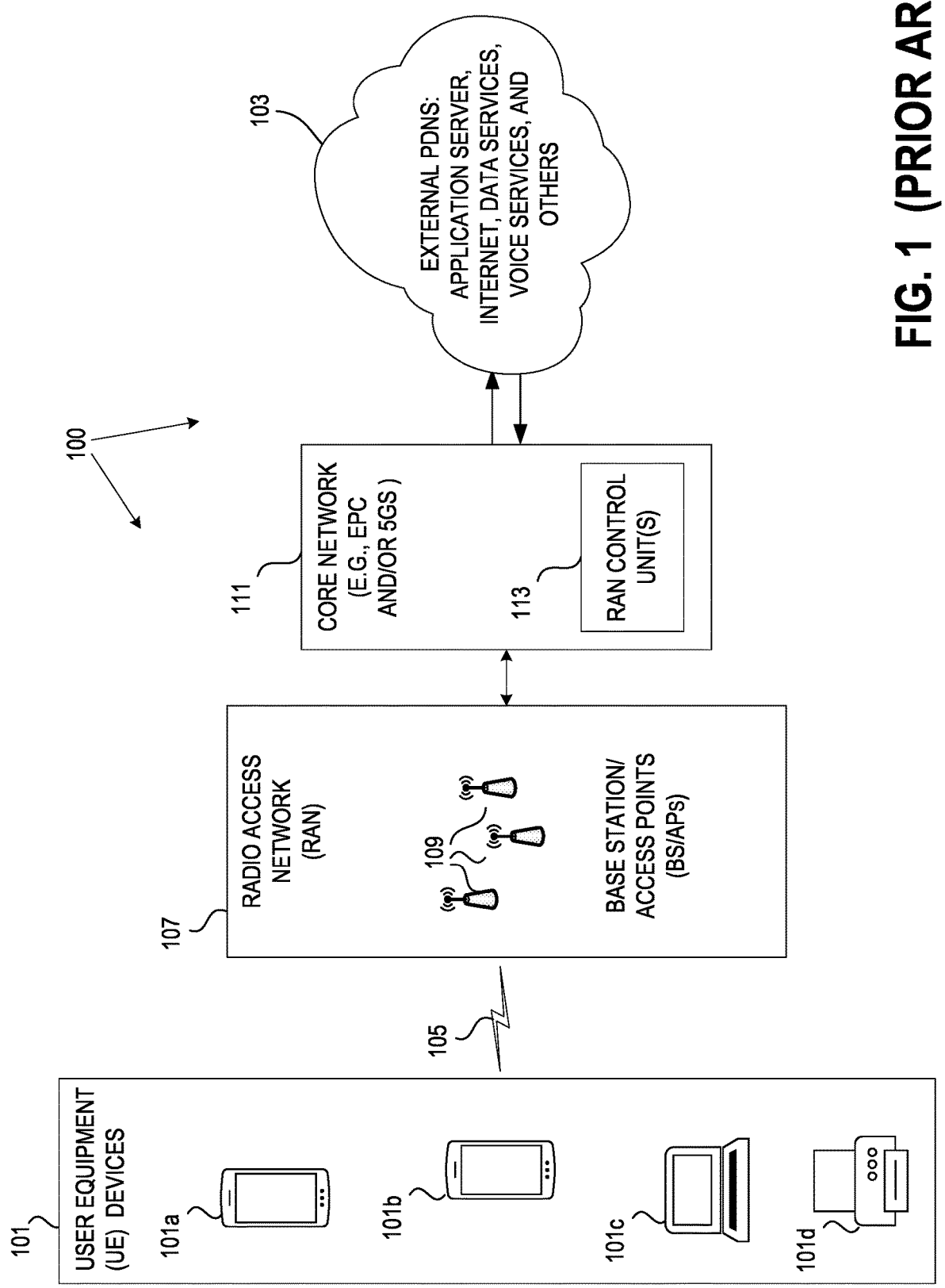
FIG. 1 is an illustration of a basic configuration for a communication network, such as a "4G LTE" (fourth generation Long-Term Evolution) or "5G NR" (fifth generation New Radio) network.
Figure 2:
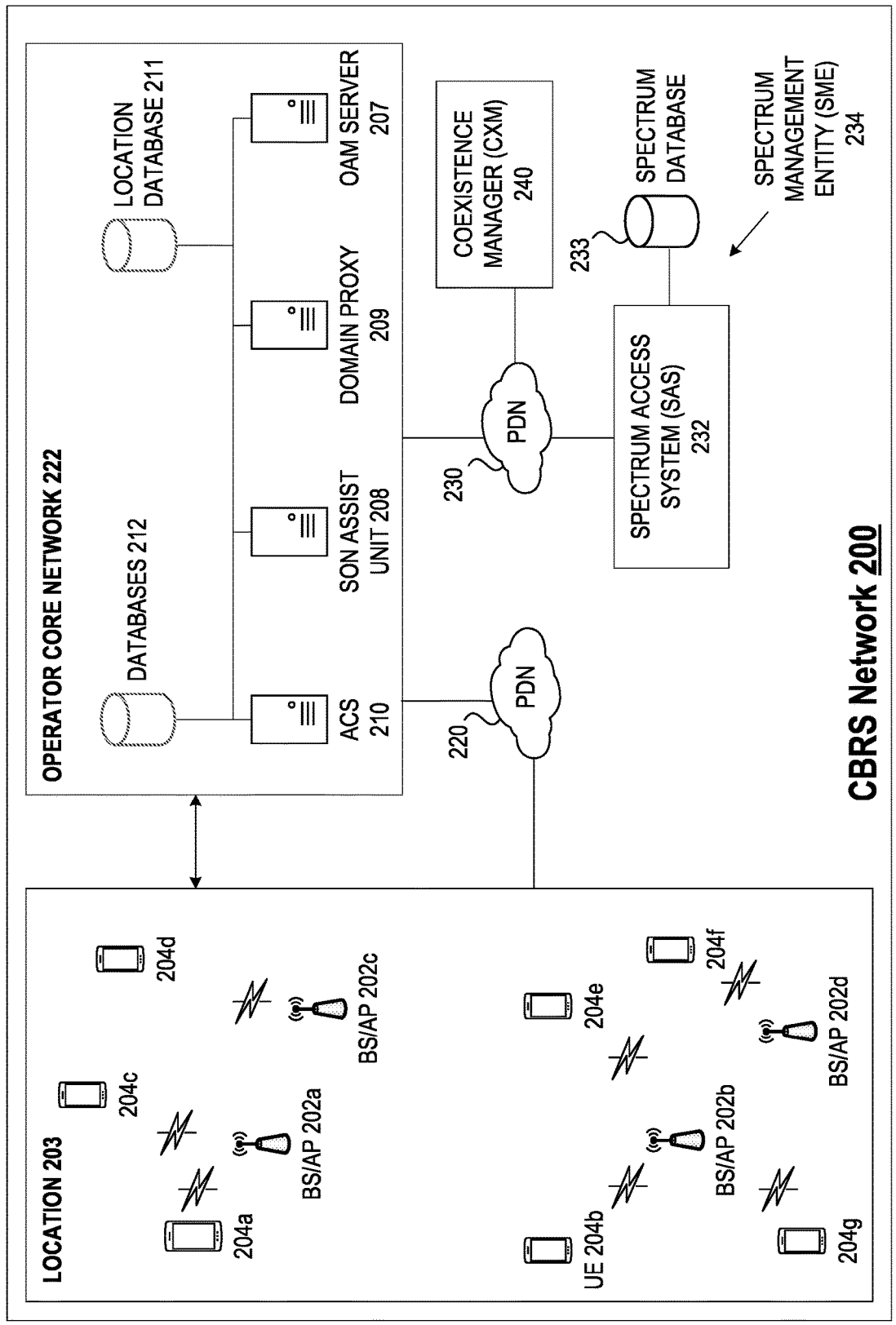
FIG. 2 is a block diagram of a wireless communication network in which a CBRS system is implemented.

An EN may comprise any appropriate wireless network technology that can connect to UEs. For example, the LTE (4G) network shown in FIG. 1 and/or the NR (5G) Network shown in FIG. 2 can be implemented in an EN. In addition, the EN may also be implemented as a CBRS network using, for example, the LTE (4G) or NR (5G) technologies; particularly, in some embodiments the enterprise wireless network operates on the Citizen's Broadband Radio Service (CBRS band), the BS/APs in the RAN comprise CBRS Devices (CBSDs) that are located at a campus location and form part of an enterprise network. In alternative implementations, other network architectures and other technologies, such as mm-wave, or spectrum purchased/licensed from others, could be utilized.

(2) Communication Networks

Communication networks and system components may be described herein using terminology and components relating to 4G, 5G, and CBRS systems and their approved (registered) interfaces including 4G (LTE) (IEEE 802.16e), 5G NR 3GPP TS 38.300, E UTRA (3GPP TS 36.300) communication systems. For instance, the term "CBSD" is one implementation of a Base Station/Access Point (BS/AP) and is used herein for descriptive purposes in the context of a CBRS system. The principles of the communication network described herein more widely apply to other communication networks and systems, and particularly to any spectrum-controlled communication system and network. In some embodiments, the enterprise wireless communication network operates on the CBRS band, and the BS/APs comprise CBRS devices (CBSDs) that are located at a campus location.

(3) Functional Blocks and Communication Links

A functional block is a computing element that performs any activity required to implement a set of logical operations. The functional block may include a dedicated processing circuit that performs an intended function, or it may be a software-implemented process across circuits that performs the intended function. In the current disclosure, the activity required to implement a set of logical operations is performed for the purpose of facilitating end to end communication (e.g., between a UE and an external server). In the communication context, the functional block may be in the control plane or the user plane. To monitor a functional block, control information is exchanged between the block and the orchestrator. For example, the orchestrator may make a query, and the functional block may respond.

A communication link is a connection between two functional blocks that provides communication between the two functional blocks. The communication link may include any appropriate connection type, such as wireless or wired, and utilize any suitable protocol. The link and/or protocol may be secure or otherwise. A communication link may be monitored at any point in the link, for example it may be monitored at its entry point and/or its exit point to provide performance data.

(4) Acronyms

Some of the acronyms used herein are as follows:
3GPP: $3^{rd}$ Generation Partnership Project
ANR: Automatic Neighbor Relation
BS/AP: Base Station/Access Point
CA: Carrier Aggregation
CAT-A: Category A CBSD
CAT-B: Category B CBSD
CBRS: Citizen's Broadband Radio Service
CBRSA: CBRS Alliance
CBRS-NID: CBRS Network ID
CBSD: CBRS devices
CCG: Common Channel Group
CPE: Consumer Premises Equipment
CQI/SRS/DMRS information
CSAS: CxM and SAS
CSG: Closed Subscriber Group (GSM/LTE concept re-used by CBRSA as CBRS-NID)
CxG: Coexistence Group
CxM: Coexistence Manager
DL SINR
DP: Domain Proxy
ECGI: E-UTRAN Cell Global Identifier, composed of HNI+Macro eNB ID+Cell ID
EN: Enterprise Network
eNB GAA
E-UTRA
GAA: General Authorized Access
HARQ: Hybrid Automatic Repeat request
HO: Handover
ICG: Interference Coordination Group
LTE: Long Term Evolution (4G)
NR: New Radio (5G)
OFDM: Orthogonal Frequency Division Multiplexing
PAL: Priority Access License
PPA: PAL Protection Area
PCI: Physical Cell Identifiers
PDN: Packet Data Network
PDSCH: Physical Downlink Shared Channel
PER: Packet Error Rate
QCI: QoS Class Index
QoS: Quality of Service
RAN: Radio Access Network
RAT: Radio Access Technology
RF: Radio Frequency
RRC: Radio Resource Control
RSRP: Reference Signal Received Power (a measurement of the received power level in a wireless network)
RSRQ: Reference Signal Received Quality
RSSI: Received Signal Strength Indication
Rx: Receiver
SAS: Spectrum Access System SCS: Sub-Carrier Spacing
SF: Sub-Frame (in LTE, a slot is the same a subframe)
SIB: System Information Block. (System information is broadcast using a Master Information Block (MIB) and a series of SIBs.)
SINR: Signal to Interference-plus-Noise Ratio
SME: Spectrum Management Entity
SON: Self Organizing Network
SRG: Spectrum Re-use Group
SSF: Special Sub-Frame
TCCS: TDD Configuration Connected Set
TCP: Transmission Control Protocol
TDD: Time Division Duplex
Tx: Transmitter
UDP: User Diagram Protocol
UE: User Equipment
UL: Uplink
UL RSSI: Uplink RSSI

(5) UEs, BS/APs, RAN, Core Network

As used herein, the term "UE", or "devices", or "UE devices" refers to a wide range of user devices having wireless connectivity, such as a cellular mobile phone, an Internet of Things (IOT) device, virtual reality goggles, robotic devices, autonomous driving machines, smart barcode scanners, and communications equipment including for example cell phones, desktop computers, laptop computers, tablets, and other types of personal communications devices. In some cases, the UEs may be mobile; in other cases, they may be installed or placed at a fixed position within a campus location. In other examples, the UEs may include factory sensors installed at fixed locations from which they can remotely monitor equipment such as an assembly line or a robotic arm's movement. Examples of services that can be provided to UEs by a wireless network include:
  voice calls;
  web browsing;
  downloads of document or other information;
  video (e.g., YouTube);
  social media (e.g., Facebook, Twitter); and
  video security cameras, sensors, and many others.

The UEs connect wirelessly over radio communication links to a Radio Access Network (RAN) that typically includes multiple base station/access points (BS/APs) that include antennas, amplifiers, and other electrical and control units for communicating with the UEs. Typically, the radio communication links operate using a Radio Resource Control (RRC) protocol, which is managed by circuitry in the BS/APs.

The term 'BS/AP" is used broadly herein to include base stations and access points, including at least an evolved NodeB (eNB) of an LTE network or gNodeB of a 5G network, a cellular base station (BS), a Citizens Broadband Radio Service Device (CBSD) (which may be an LTE or 5G device), a Wi-Fi access node, a Local Area Network (LAN) access point, a Wide Area Network (WAN) access point, and should also be understood to include other network receiving hubs and circuitry that provide access to a network of a plurality of wireless transceivers within range of the BS/AP. Typically, the BS/APs are used as transceiver hubs, whereas the UEs are used for point-to-point communication and are not used as hubs. Therefore, the BS/APs transmit at a relatively higher power than the UEs.

A Core Network provides a number of functions and services, including an interface between the RAN and other networks. In one important function, the Core Network provides the UEs in the RAN with access to other devices and services either within its network, or on other networks such as the External PDNs. Particularly, in cellular networks and in private networks, the UEs wirelessly connect with BS/APs in the RAN, and the RAN is coupled to the Core Network. Therefore, the RAN and the Core Network provide a system that allows information to flow between a UE in the cellular or private network and other networks.

In addition to providing access to remote networks and allowing information to flow between the cellular network and the external PDNs, the Core Network may include RAN Control Units that manage the wireless network and provide control of the air interface between the BS/AP and the UEs. The Core Network may also coordinate the BS/APs to minimize interference within the network.

(6) CBRS Networks

A Citizen's Broadband Radio Service (CBRS) system is a wireless, spread-spectrum communication system that includes a plurality of wireless channels, and is subject to certain operational rules. A CBRS network utilizes the CBRS radio band of 3550-3700 MHz, nominally divided into fifteen channels of 10 MHz each. Particularly, the US Federal Government recently approved use of the CBRS band of the frequency spectrum and finalized rules (Rule 96) that allow general access to the CBRS band. The CBRS rules set forth detailed requirements for the devices that operate in a CBRS network and how they communicate. Both LTE networks and 5G networks can be implemented in CBRS systems. Base stations (BS/APs) within a CBRS network are termed "CBSDs", and UEs are termed End User Devices (EUDs). All the CBSDs are connected to an operator Core Network by any appropriate communication means, such as wire, fiber optic, wireless radio and/or a PDN, which includes components such as an OAM Server, a SON assist unit, a Domain Proxy, an Automatic Configuration Server (ACS), a Location Database, and other databases, all of which are connected to each other within the operator Core Network by any appropriate means. The operator Core Network is connected to an SAS, which is connected to a Spectrum Database that includes data regarding the spectrum that it is managing; collectively, the SAS and the Spectrum Database are referred to as a Spectrum Management Entity (SME).

(7) RF Environment, Campus Location

The design of a wireless network deployment, and the allocation of resources in a deployed RAN, is greatly dependent upon the RF environment at the campus location where the RAN is deployed. At any RAN deployment, the RF environment can vary due to a variety of causes; for example, physical obstacles like buildings affect the RF environment, also the relative positioning of the transmitters and UEs, interference, campus layout, features, and building construction: walls, materials, carpeted/non-carpeted all can affect the RF environment and may vary widely between locations. In other words, the RF environment can vary greatly within a RAN, and accordingly each BS/AP may see a different path loss.

Figure 3A:
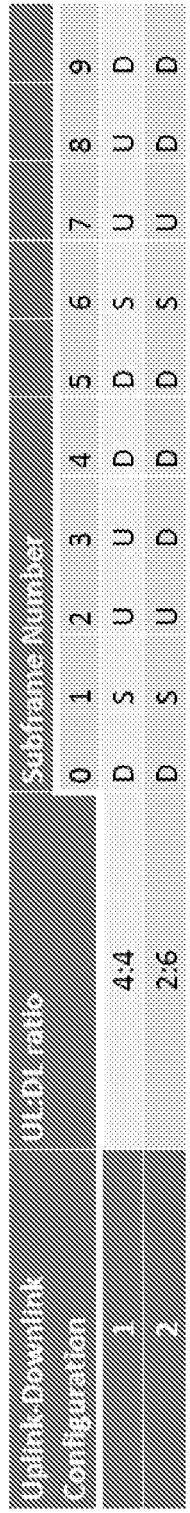
FIG. 3A is a table that shows LTE TDD configurations.
Figure 3C:
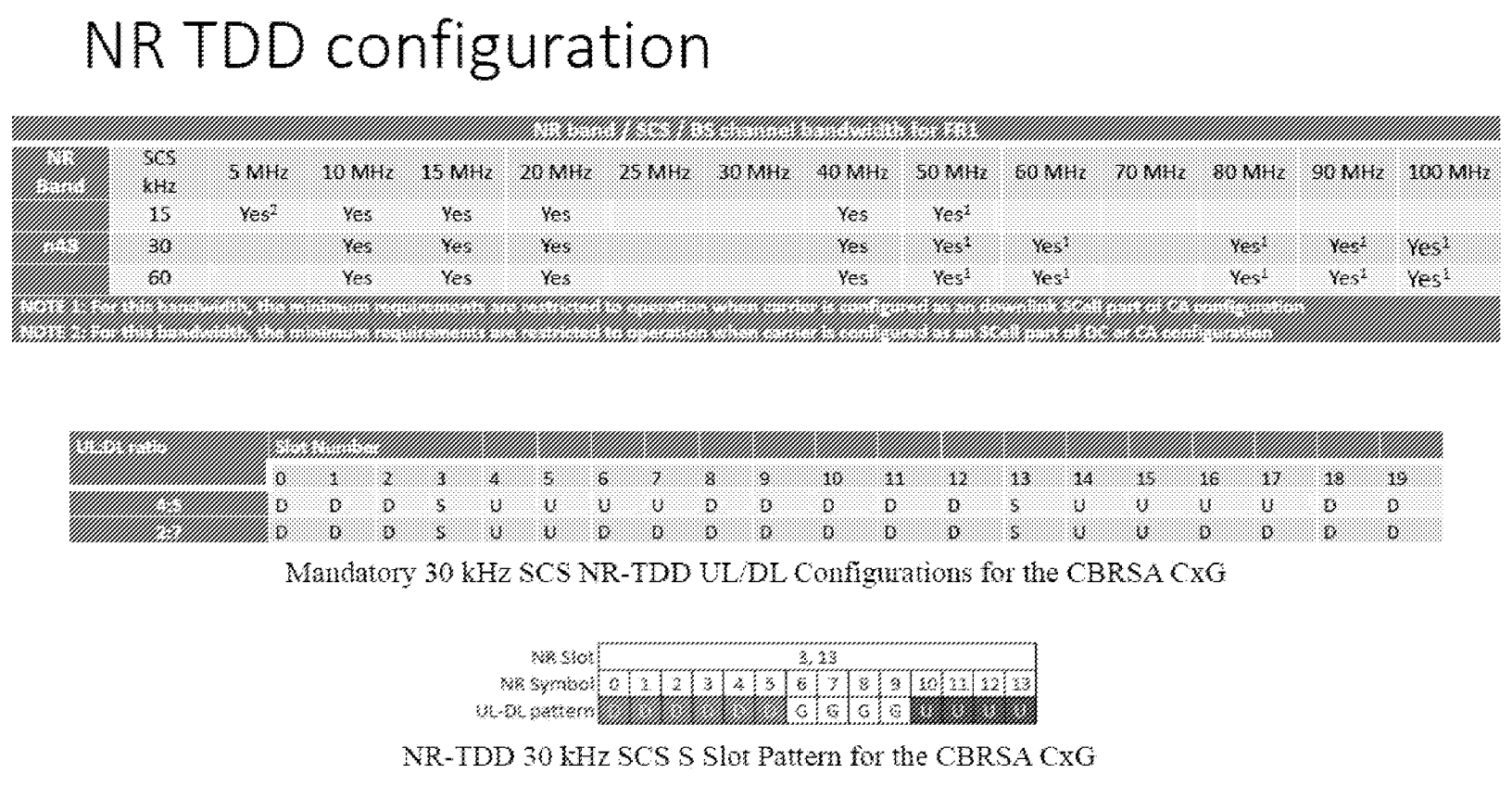
Figure 5:
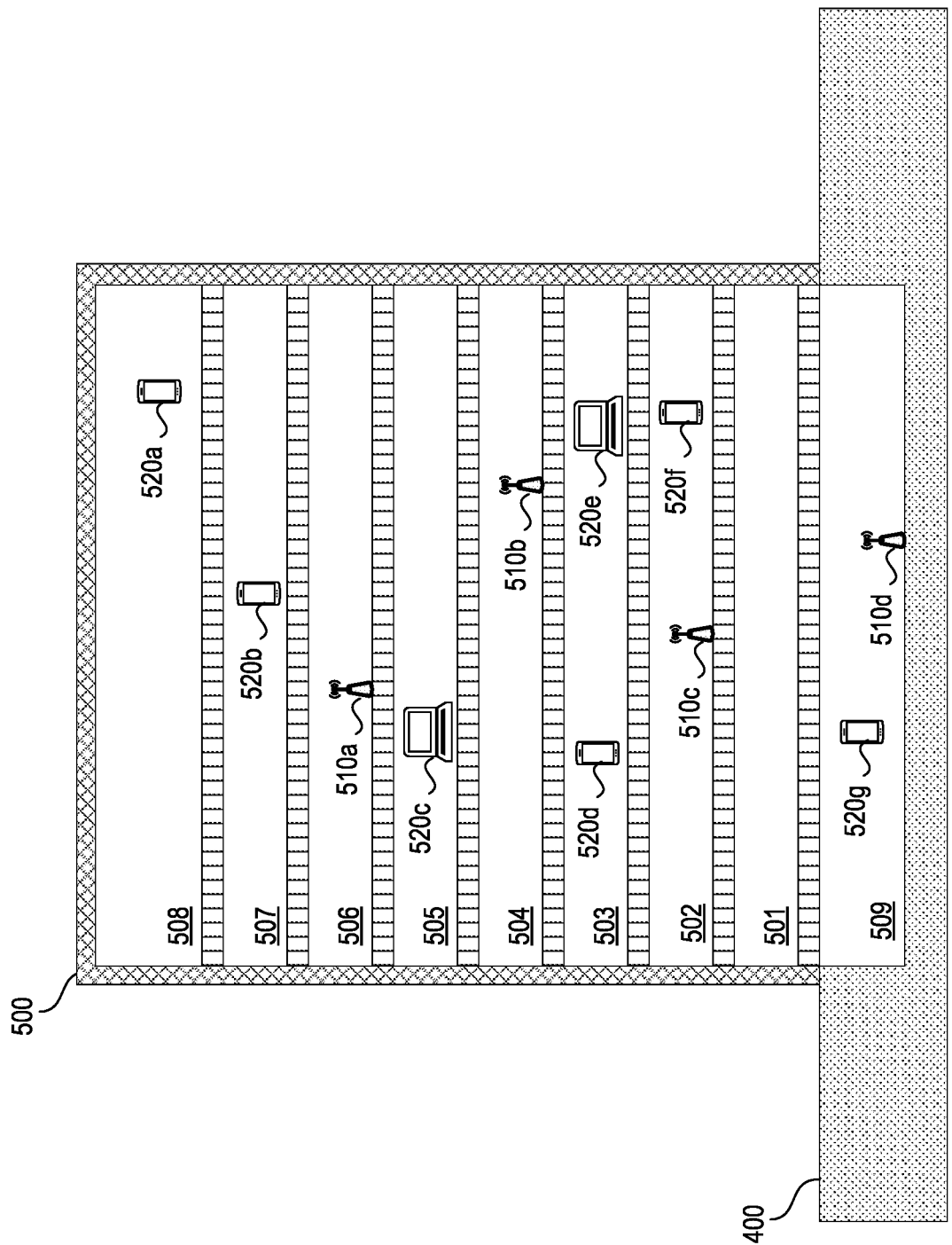
FIG. 5 is a cross-sectional view of a building on the campus location.

Following are examples of a campus location and a building in which a RAN is deployed, all of which contribute to the RF environment. Particularly, FIG. 3 is a perspective illustration of a campus location 400 that has wireless coverage and FIG. 5 is a cross-sectional view of a building 500 on the campus location 400.

Figure 4:
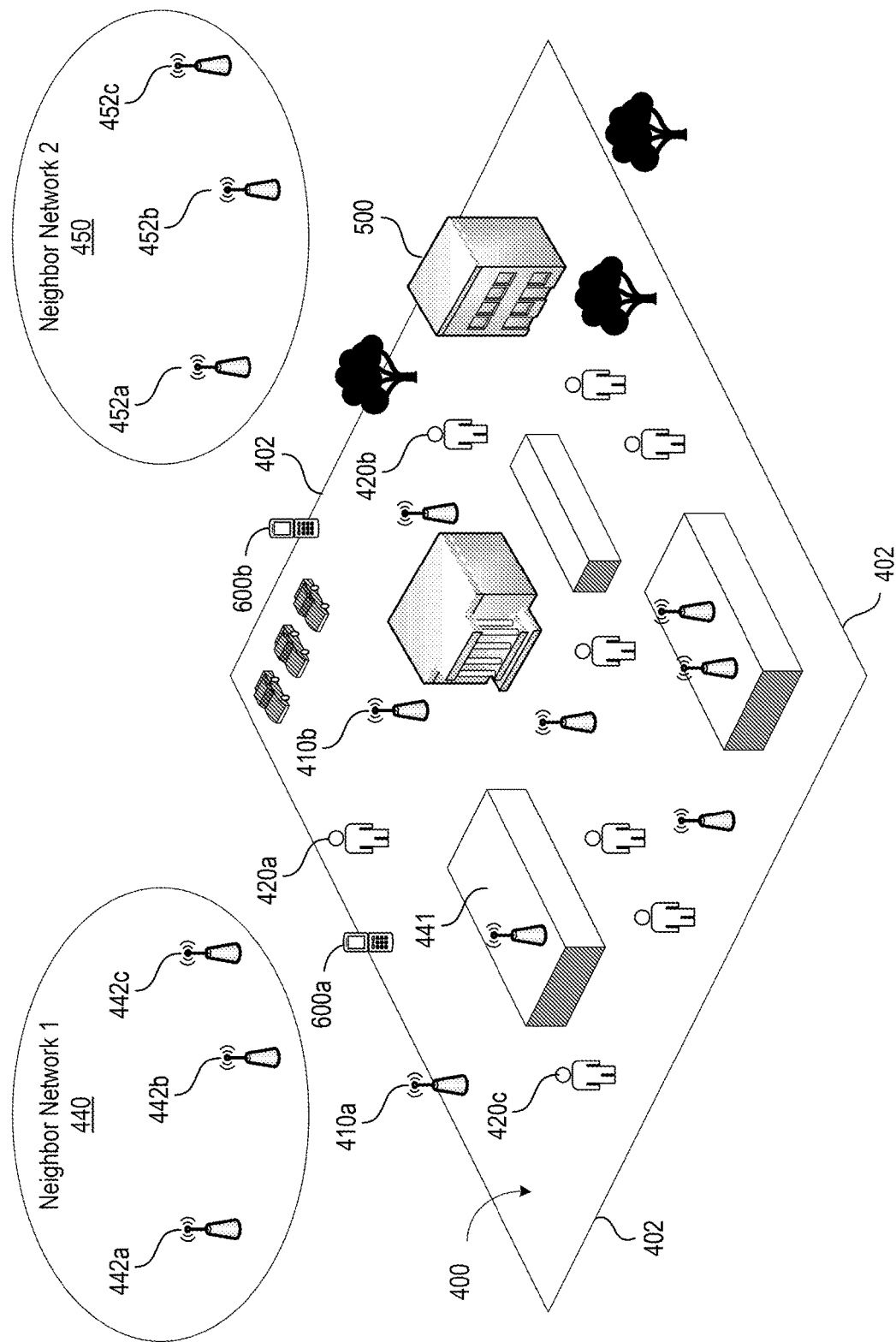
FIG. 4 is a perspective illustration of a campus location of an Enterprise Network.

FIG. 4 is a perspective illustration of a campus location 400 in which a plurality of BS/APs including at least a first BS/AP 410a, a second BS/AP 410b (collectively 410) of an Enterprise Network (EN) (sometimes the "deployed network") are installed to provide wireless coverage to a plurality of mobile users such as a first user 420a a second user 420b, and a third user 420c (referred to collectively as 420). Each mobile user 420 may be carrying one or more UEs such as a mobile phone, laptop computer, or some other device that can be connected to the EN.

The campus location 400 defines a boundary perimeter 402, and the BS/APs 410 are deployed within the boundary 402. The positions and configuration of the BS/APs 410 deployed within the campus location 400 are selected to provide wireless coverage to the plurality of users 420 for the EN. The BS/APs 410 may be installed indoors and outdoors, and may comprise any type of BS/AP. The BS/APs 410 generally provide wireless coverage substantially throughout the campus location 400, indoor and outdoor, with coverage usually extending to surrounding areas at least to some extent. In one embodiment the BS/APs 410 comprise CBSDs and the EN includes a CBRS network. In some embodiments some of the BS/APs 410, particularly the BS/APs installed indoors, have a UE built into them. These built-in UEs can be used for making measurements that can be used to determine the MN footprint information, as described herein.

Outside the campus location 400, there may be a number of neighbor networks, including a first neighbor network 440 that include a plurality of BS/APs 442 and a second neighbor network 450 that includes a plurality of BS/APs 452. The wireless communication signals from these neighbor networks can interfere with wireless communication in the EN. Particularly, the wireless BS/APs and UEs in the neighboring networks may be operating using a different TDD configuration than the Enterprise Network, which can cause TDD interference. Generally, TDD interference is caused due to mismatched TDD configurations in an RF footprint, and may originate in external (neighboring) networks, or internal sources.

In FIG. 4, to detect TDD interference as will be described in detail, a first probe UE 700a (see FIG. 7) is positioned on the campus 400, close to the boundary 402, and near to the first neighbor network 440. Similarly, a second probe UE 700b (see FIG. 7) is positioned on the campus 400, close to the boundary 402, and near to the second neighbor network 450 to detect TDD interference from the second neighbor network 450.

FIG. 5 is a cross-sectional view of a building 500 on the campus location 400 in which a plurality of BS/APs of the RAN are installed on different floors. In this example, a first BS/AP 510a is installed on the sixth floor 506, a second BS/AP 510b is installed on the fourth floor 504, a third BS/AP 510c is installed on the first floor 501, and a fourth BS/AP 510d is installed in the basement 509. Building construction (walls, materials, carpeted/non-carpeted) can vary widely between locations, and all can affect the RF environment. In some embodiments, the indoor BS/APs 510 have a UE built into them, which can be used for making measurements.

(8) Overview: Interference Detection and Mitigation

Figure 6:
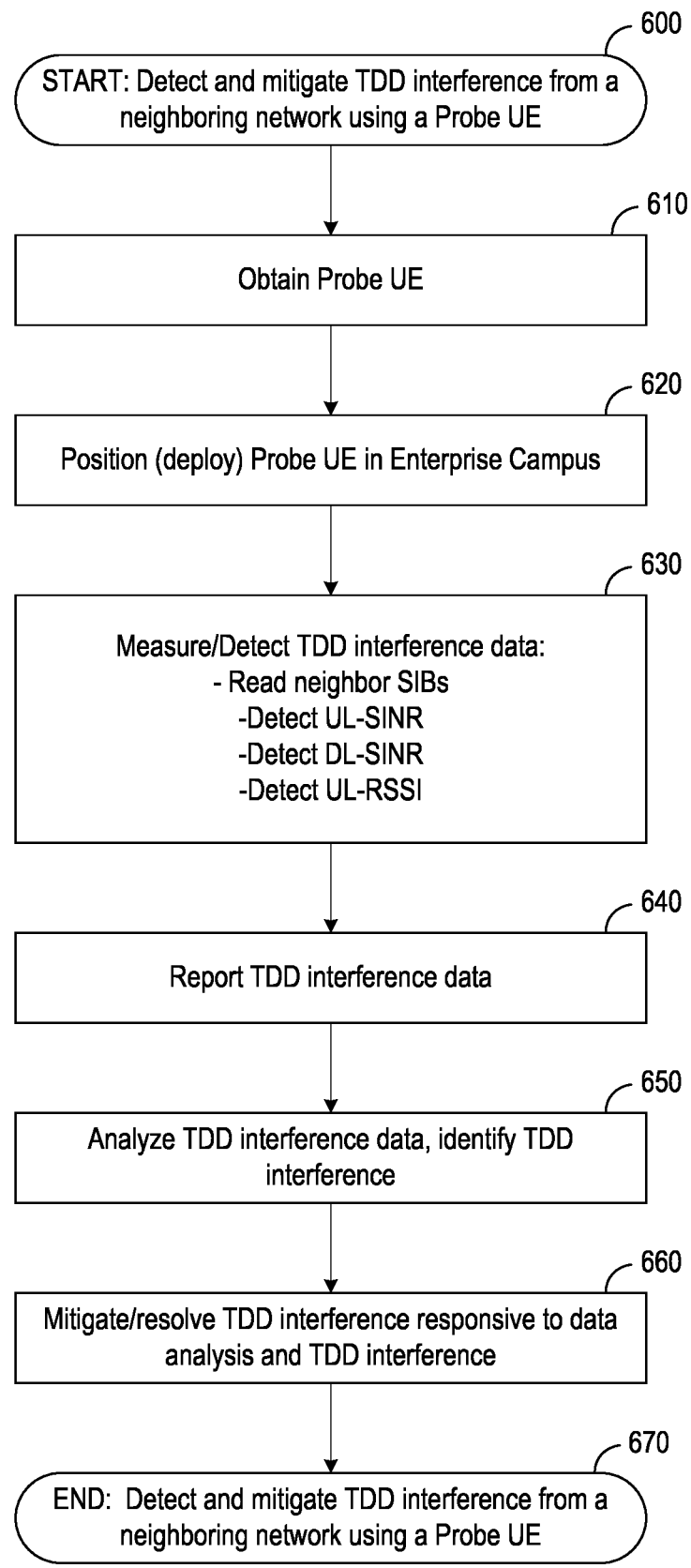
FIG. 6 is a flow chart showing an overview of operations to use a Probe UE to detect and mitigate TDD interference from a neighboring network.

FIG. 6 is a flow chart showing an overview of operations, starting at 600, to use a probe UE in a CBRS network to detect and mitigate TDD interference from a neighboring network. First, a probe UE is obtained. (STEP 610). A probe UE is described in more detail with reference to FIG. 7. The probe UE is then positioned (deployed) on the Enterprise Campus (STEP 620), which is described in more detail with reference to FIGS. 4 and 6.

Once deployed on the Enterprise Campus, the Probe UE can measure TDD interference data (STEP 630). Any of a number of methods may be utilized by the Probe UE for detecting interference including:

Reading neighbor CBSD SIBs (System Information Blocks), using the neighbor SIBS that are broadcast freely, providing a broadcast message that any receiving device within range can read.

Detection using UL SINR (Uplink Signal-to-Interference plus Noise Ratio).

Detection using DL SINR (Downlink SINR).

Detection using a signal strength measure such as UL RSSI (Received Signal Strength Indicator) or RSRP (Reference Signal Received Power).

Figure 15:
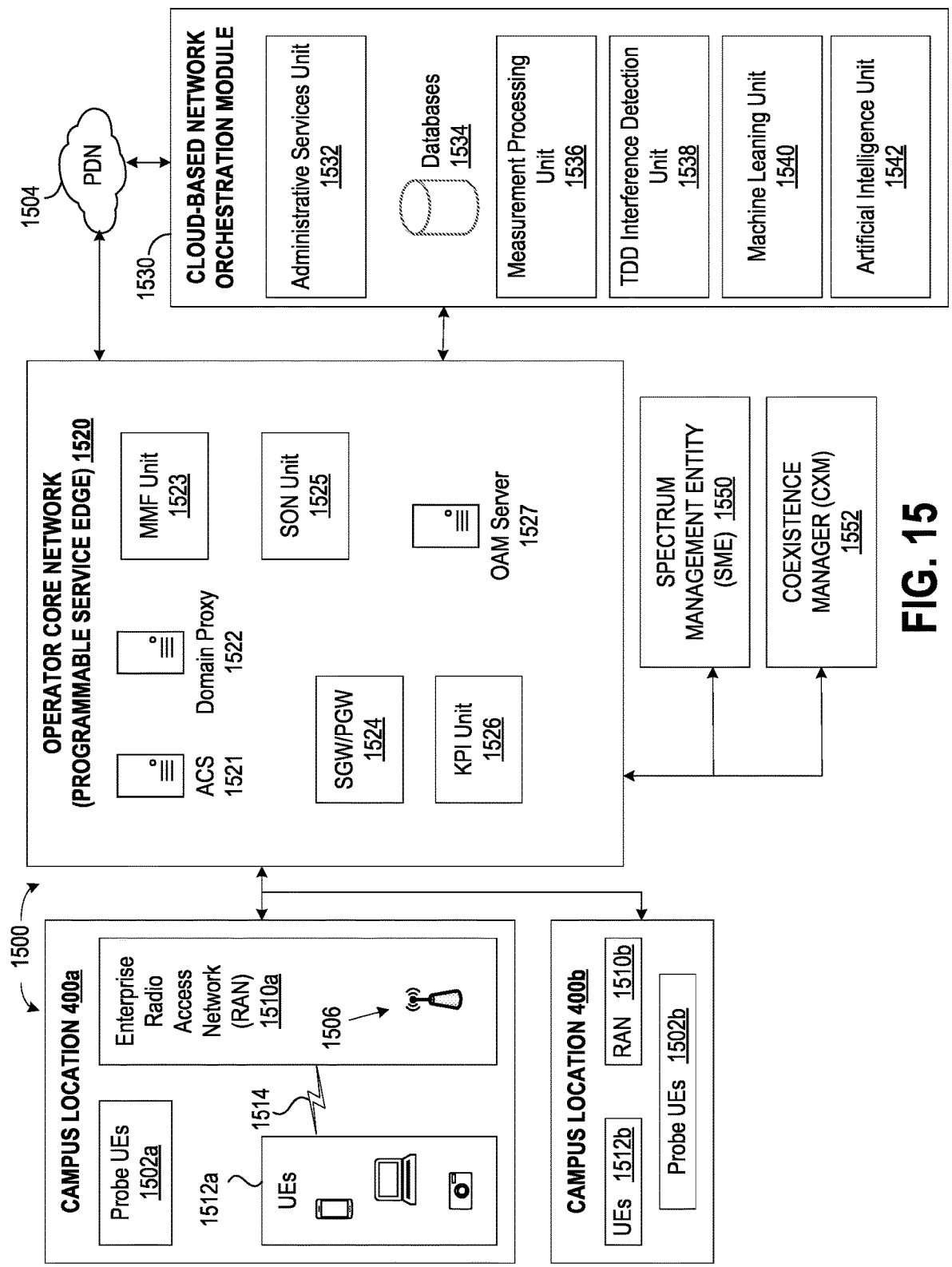
FIG. 15 is a block diagram of an implementation of Probe UEs in an Enterprise Network (EN), and a Cloud-Based Network Orchestration Module.

Information from probe UEs in an EN campus is then reported (STEP 640) to the Enterprise Network, and collected at a centralized location, such as the orchestrator (see FIG. 15). At the centralized location, the TDD interference data can be analyzed and the TDD interference source can be identified, or at least a reasonable determination can be made. (STEP 650).

Responsive to the TDD interference determined from the previous operations, steps can be taken to mitigate or resolve the TDD interference problem. (STEP 660) Mitigation options are disclosed for mitigating interference after detecting potential interference. One mitigation option is to switch the TDD config, perform detection operations, and observe the results. Resolution actions, for determining how to switch the TDD configuration if a potential problem is detected, are also disclosed.

The same principles of detecting TDD interference can also be applied to detect TDD interference within the Enterprise Network or on the Enterprise campus itself. For example the same principles and measurements performed can be used to detect the TDD configuration across channels/cells that are deployed within the same network; for example it can be used to detect a security camera system that requires UL centric TDD slot configuration while Internet traffic requires a DL centric configuration. The deployed network can be partitioned to support different TDD configurations based on the use cases/devices connected to the individual BTS-CBSDs. The footprint and interference impact can be measured to optimize a given deployment as well.

(9) Mitigation and Resolution

If interference has been detected, following are some options for mitigation and resolution:

Check performance after restricting specific UEs to non-conflicting UL slots to see if the performance improves. This can be empirical detection, and may operate continuously Deploy a probe on campus to check infringing networks.

Identify the issue and talk to SAS vendors to see if the problem can be resolved through other means including realignment of channel assignments. In this option, a potential TDD config switch can be delayed until it is determined that the TDD really needs to be changed. This approach will allocate channels to CBSDs that are close to (nearby) the interfering entities, so that the channel assignments are farther apart.

Limit use of interfering channels to locations farther inside the building.

Switch to another TDD config if nothing else can be done to resolve the issue.

(10) How to Switch the TDD Config after a Problem is Detected

The TDD config can be switched as follows:
1. If TDD Config is '0' or '1', the system may switch to TDD Config 2.
2. Switching the TDD config will require a round of negotiations with the CSAS.
3. Switching to TDD Config 2 may result in a capacity drop and may require the network to be re-planned.

One proactive alternative is to plan the network based on TDD Config 2, and opportunistically use TDD Config 1, such as for deployments that may be at potential risk of encountering such interference. If needed the system can then be switched to TDD Config 2 without re-planning the network.

After mitigation/resolution (STEP 660), operations to detect and mitigate TDD interference from a neighboring network in FIG. 6 are complete (STEP 670).

(11) Probe UEs

Figure 7:
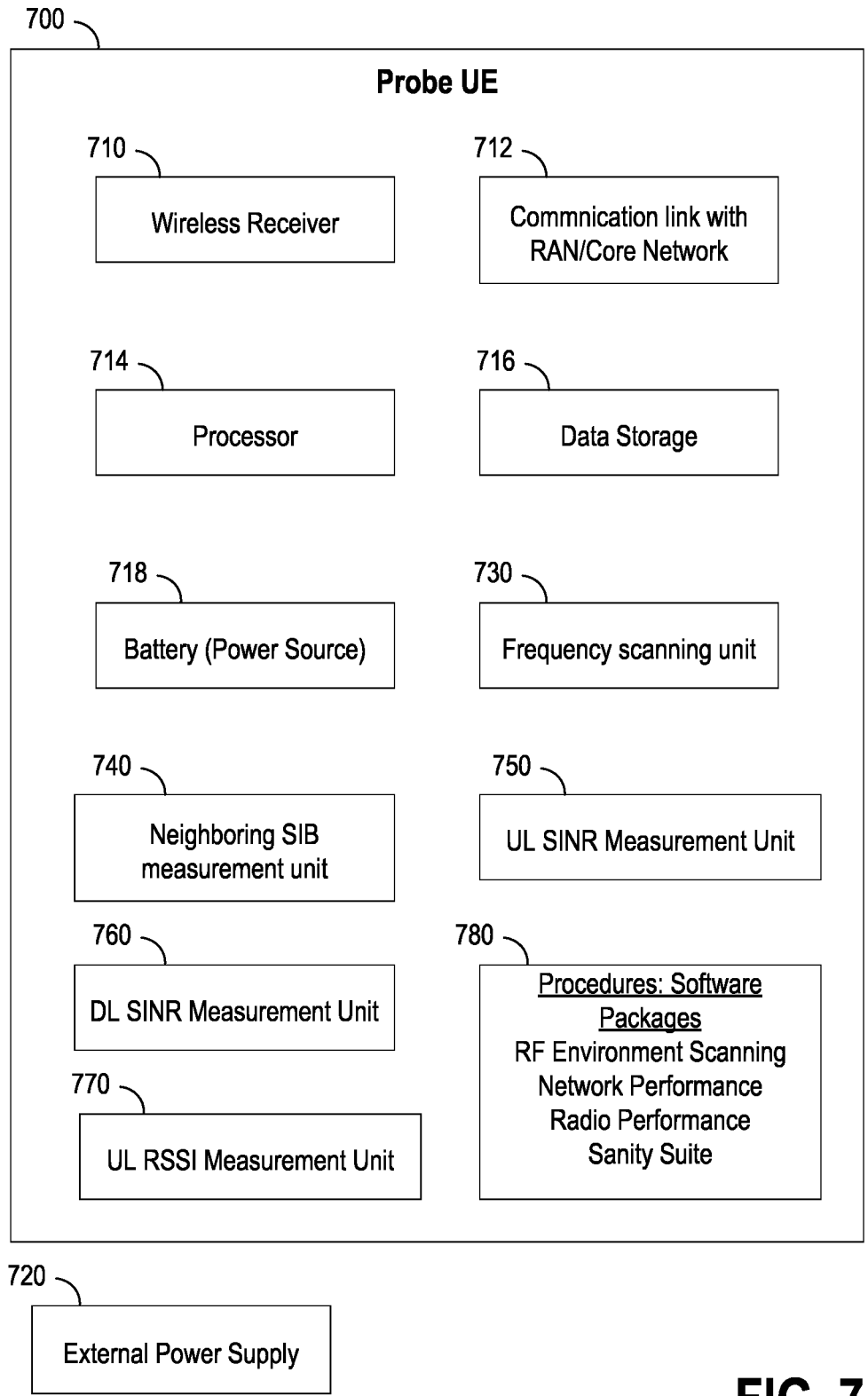
FIG. 7 is a block diagram of one embodiment of a Probe UE.

FIG. 7 is a block diagram of one embodiment of a Probe UE 700. Generally, a Probe UE is a device that can receive wireless signal in a plurality of bands, store signal qualities, and send them to a core network. A Probe UE may be a conventional UE such a mobile phone, tablet, or laptop, and it may be enhanced with other capabilities, such as the ability to connect with a modem and get communication information and statistics from it. Usually, a conventional mobile device includes all necessary or useful hardware; e.g., hardware to measure all CBRS channels and adjoining channels, and report to the core network. The UE can be programmed to perform operations described herein. Generally, a probe UE will be connected to a continuous power source, so battery life is not an issue, so some mobile UE operations may be deferred to the probe UEs. Also, a Probe UE may also be in the form of any Customer Premises Equipment (CPE), which includes any telecommunications and information technology equipment on the campus, such as telephone headsets and modems that can perform the Probe UE functions.

In the block diagram of FIG. 7, the Probe UE 700 includes a wireless receiver 710, a communication link 712 with the RAN/Core Network (wireless or wired), a processor 714, data storage 716 and a battery (power source) 718 that may be connected to an external power supply 720. The Probe UE 700 has circuitry and software to perform operations and measure signal qualities, such as a frequency scanning unit 730, a unit 740 to read the SIBs of neighbors (may be used to detect the TDD configurations in use in the neighbor networks, as described with reference to FIG. 10), and signal strength measuring units such as a UL SINR measurement unit 750 (see operations in FIG. 12), a DL SINR Measurement Unit 760 (see operations in FIG. 13), and a UL RSSI Measurement Unit 770 (see operations in FIG. 14). A plurality of software packages 780 may be installed in the Probe UE 700, which may implement procedures and probe UE functions, for example RF Environment Scanning, Network Performance Monitoring and Tests, Radio Performance, and a Sanity Suite, which are described elsewhere in this application.

Figure 9:
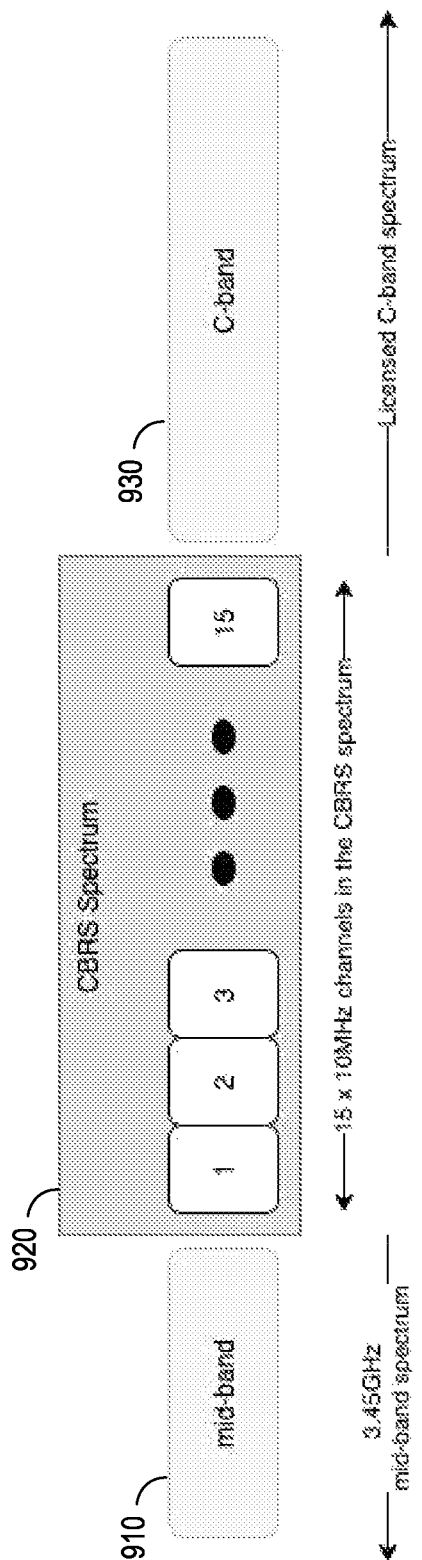
FIG. 9 is a block diagram illustrating the CBRS spectrum and the adjoining spectrum including the mid-band spectrum at the lower end and the C-band spectrum at the upper end.

In some embodiments, the wireless receiver 710 may include circuitry to measure channels adjacent to the CBRS band. FIG. 9 is a block diagram illustrating the CBRS spectrum 920 and the adjoining spectrum including the mid-band spectrum 910 at the lower end and the C-band spectrum 930 at the upper end. The fifteen channels within the CBRS spectrum are shown, and in a CBRS implementation, the probe UE has the hardware and software to receive signals in these fifteen channels. In some embodiments the probe UE 700 can also detect interference signals in the neighboring portion of the mid-band spectrum 910 and/or the C-band spectrum 930 adjacent to the CBRS channels, where interference may occur. Particularly, these Probe UEs have the hardware and software to scan the adjacent bands, and report it to the network.

The probe UE 700 could be a dedicated UE device, or could be part of a CBSD that has UE capabilities built-in. Particularly, in a CBRS embodiment, Probe UEs (Probe Nodes) used for detecting neighbor information may include:

For CAT-A CBSD: use the built-in UE (the UE built into the CBSD) to perform a periodic check of the other CBRS channels to see if SIB-1 broadcasts indicate the use of TDD Config 2;

For CAT-B CBSD: Built in UEs are typically not included with CAT-B APs;

Specific UEs may be deployed at a particular location on the enterprise campus as probe UEs.

(12) Deploying and Positioning Probe UEs

Figure 8:
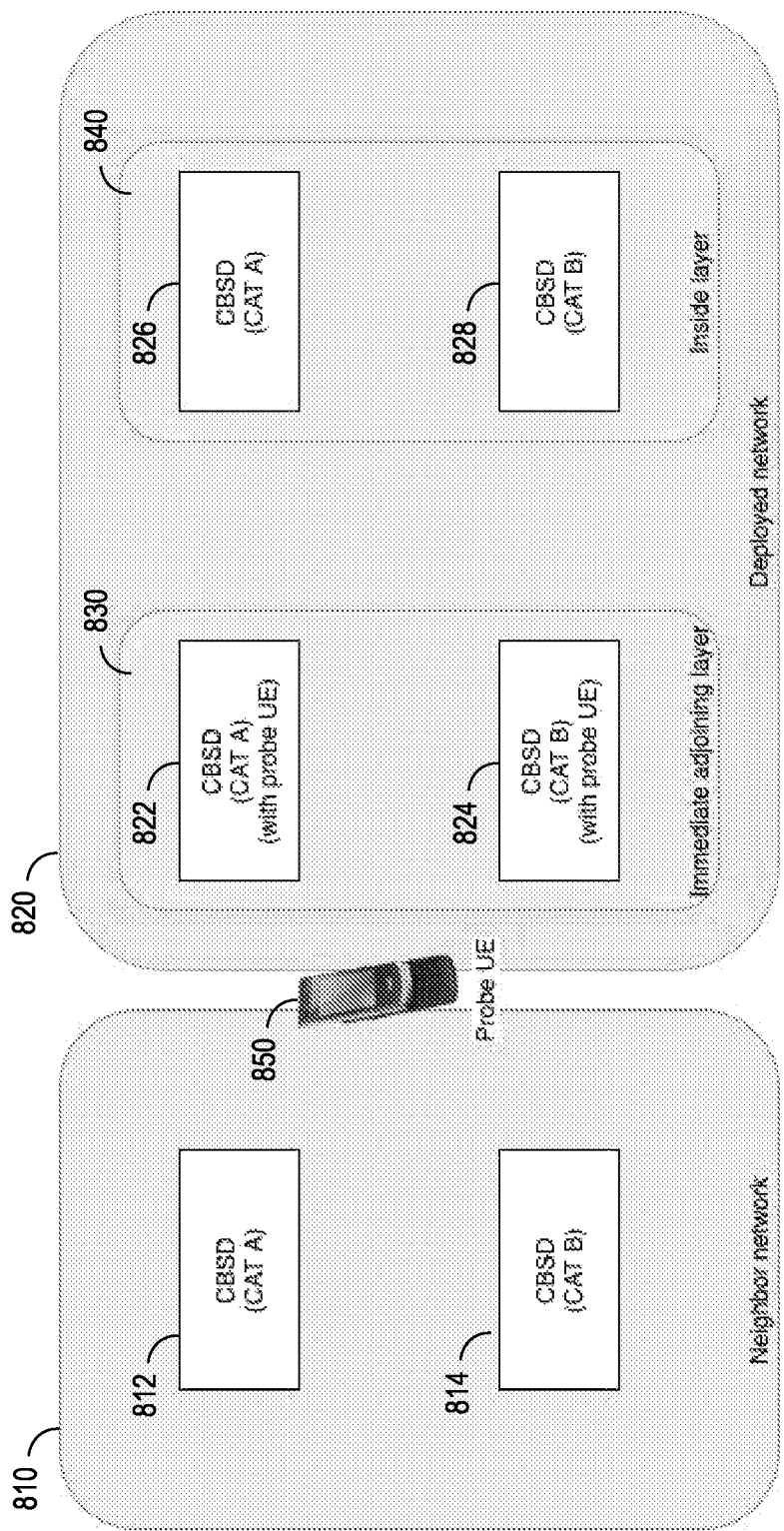
FIG. 8 is a diagram showing Probe UEs/CBSDs in a deployed CBRS Enterprise network, and CBSDs in a neighbor network.

FIG. 8 is a diagram showing CBSDs 822, 824, 826, 828 in a deployed Enterprise network 820, and also showing CBSDs 812, 814 in a neighbor network 810. The CBSDs in each network can be CAT-A, CAT-B or any other type of CBSD that may become implemented in CBRS networks. In the example of FIG. 8, the neighbor network 810 is shown including a first CBSD 812 that is a CAT-A type, and second CBSD 814 that is a CAT-B type. In any particular embodiment there may be many CBSDs of both types. The deployed network 820 includes CBSDs 822,824 that have probe UEs, which are described herein.

Referring briefly to FIG. 4, the first probe UE 700*a* is positioned near to the first neighbor network 440 to detect TDD interference, and a second probe UE 700*b* (see FIG. 7) is near to the second neighbor network 450 to detect TDD interference from the second neighbor network 450. In the diagram of FIG. 8, the CBSDs with probe UEs are positioned proximate to the neighbor network 810; particularly in FIG. 8, the CBSDs 822, 824 with probe UEs are positioned proximate to the neighbor network 810.

An outer layer 830 may be defined in the deployed network 820, adjacent to the neighbor network 810, that defines an area subject to interference from the neighbor network 810.

In FIG. 8, a probe UE 850 is illustrated situated in a position where it can receive signals from both the neighbor network 810 and the deployed network 820. Generally, a probe UE 850 is a wireless device positioned at a fixed, strategic location in, or proximate to, the enterprise location. The position may be between the two networks, or in an area where the signals from each network overlap to at least some extent. Typically, a probe UE will be positioned near or within the boundary of the enterprise location, where a mobile UE expects some level of service. Generally, it is not useful to place a probe UE within the neighboring network location because wireless coverage in the neighboring network is not of interest to the Enterprise Network.

The deployed network 820 may also include additional CBSDs in the inside layer 840, positioned farther from the neighbor network 810 that do not include probe UEs. In FIG. 8 these CBSDs in the inside layer 840 include a CBSD 826 (CAT-A) and a CBSD 828 (CAT-B), in other embodiments there may be many CBSDs of both types.

The Enterprise Network campus may be considered as defining outer layers in which UEs are subject to interference from a neighboring network and an inner (inside) layer substantially isolated from interference from the neighboring network. In an inside layer, all CBRS bands may be usable, and can be assigned to the BS/APs within those inside layers. In outside layers, in order to provide best service, CBRS bands can be limited to those that don't have much interference from neighboring networks.

(13) TDD Conflict Detection

As discussed above, the TDD configuration for a deployment is selected by the CBSDs or some other mechanism within the deployment. Any particular TDD configuration selected for CBSD operation can be impacted by interference, for example interference may be caused by:
- Other CBSDs deployed in the CBRS spectrum;
- High power CBSD systems: for some environments: the FCC has approved higher-powered (75 dBm urban/77 dBm rural) operation relative to the CBRS channels (30 dBm CAT-A/47 dBm CAT-B); and
- Interference from the adjoining mid-band spectrum (e.g., 2.45 to 3.45 GHz) or the adjoining C-band spectrum (e.g., 3.7 to 3.98 GHz).

(14) Detection by Reading Neighbor CBSD SIBs

CBSDs broadcast SIBs that include information useful for UEs that want to connect to the network, and other information. The broadcast information includes the TDD configuration currently being used by the CBSD (and the network to which it is connected). Probe UEs can be used to report information on neighbors deployed on the CBRS channels.

Figure 10:
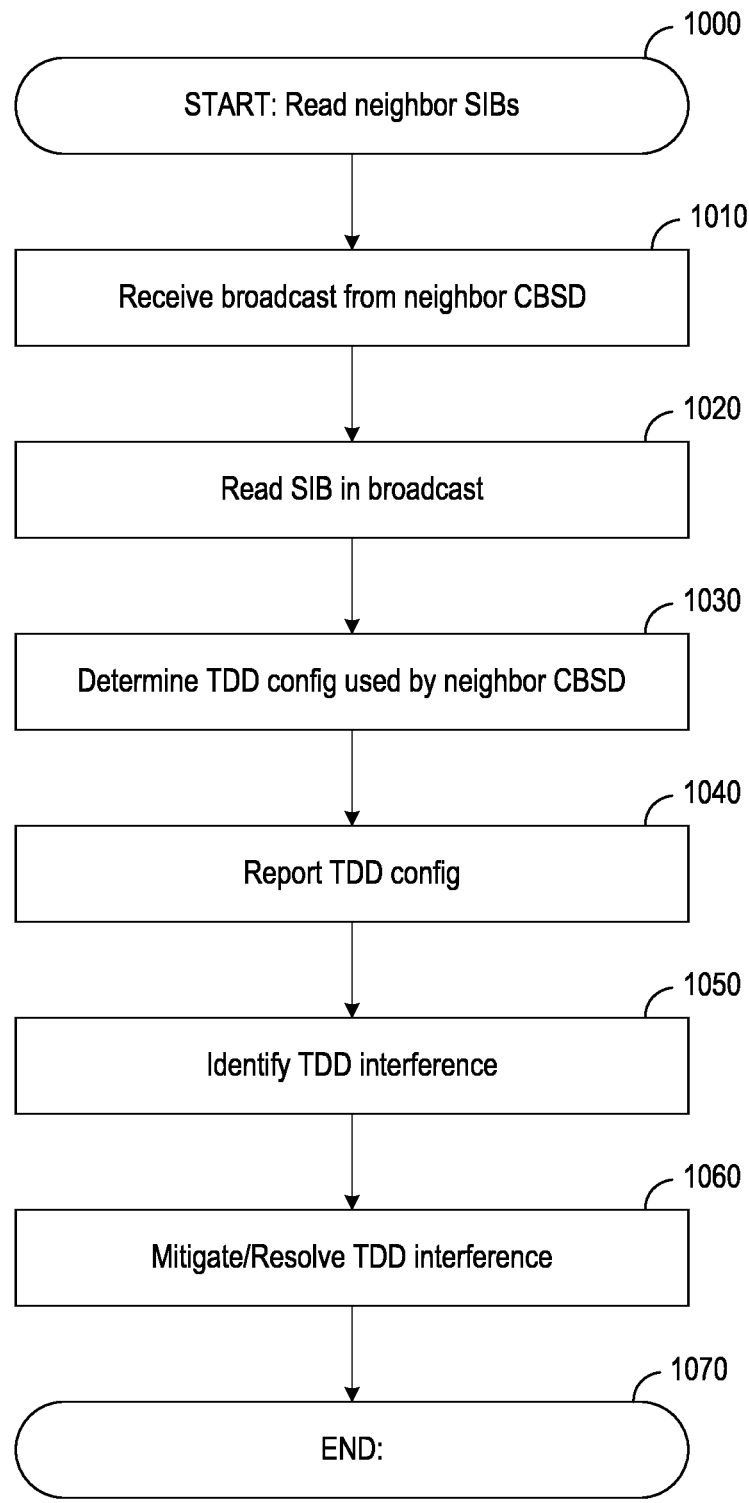
FIG. 10 is a flow chart of operations to read a SIB from a neighbor network.

FIG. 10 is a flow chart of operations, starting at STEP 1000, to read a SIB from a neighbor broadcast. As discussed above, a Probe UE may be deployed in a position in the Enterprise Campus where it can receive signals from one or more neighboring networks, and may be able to receive a broadcast (STEP 1010) from a CBSD in a neighboring network. If it can receive a broadcast, then it reads the SIB (STEP 1020), determines the TDD config used by the neighbor CBSD (STEP 1030), and then reports the TDD config (STEP 1040) to the centralized location, such as an orchestrator, that uses this information to help analyze and determine TDD interference. This information may be used to mitigate or resolve any TDD interference determined.

It may be noted that interference will likely be sensed more easily (i.e., more detectable) on the UL side. Also, measurements of signal strength of neighbor CBSDs may be recorded and reported.

Figure 11:
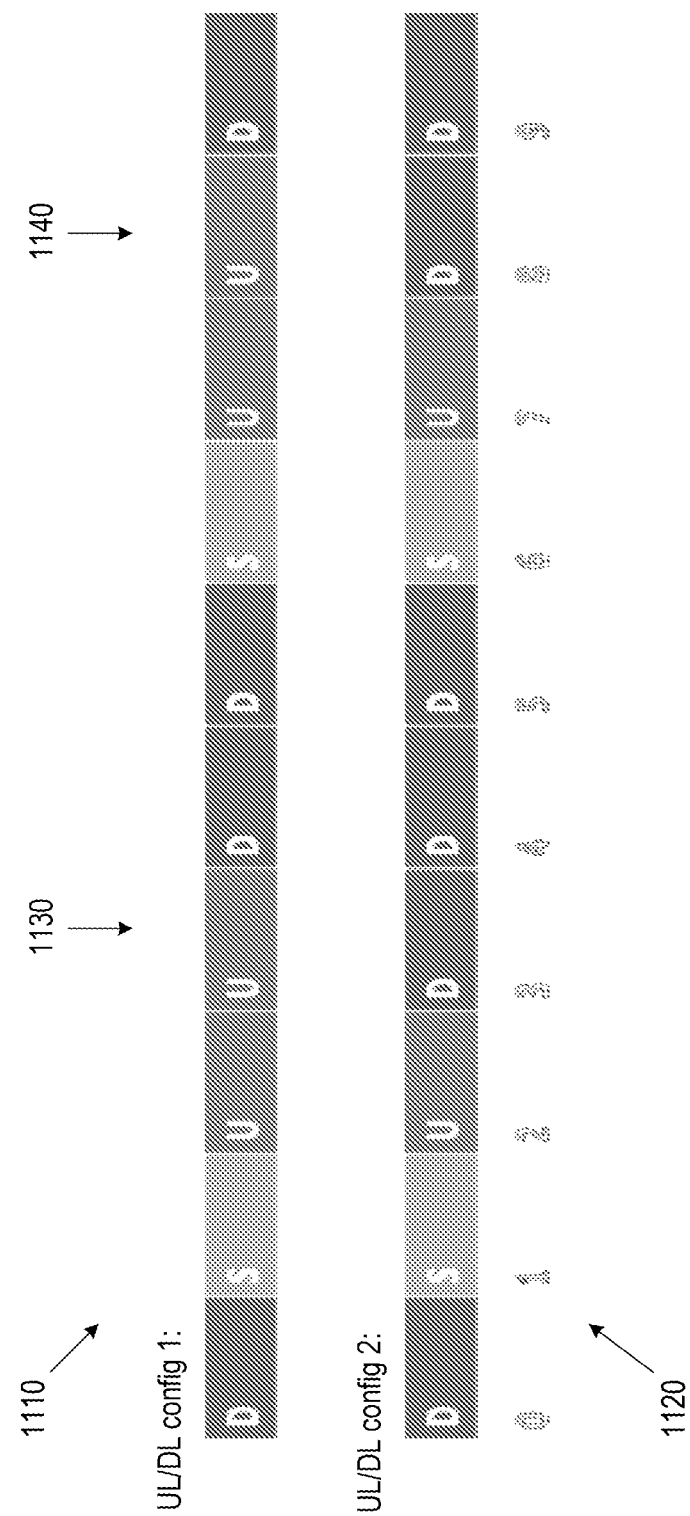
FIG. 11 is a diagram showing two widely-used TDD configurations in 4G, including UL/DL slots in TDD config 1 and TDD config 2.

(15) Detection Using UL and DL (FIG. 11)

FIG. 11 is a diagram showing UL/DL configurations including UL/DL config 1 (shown at 1110) and UL/DL config 2 (shown at 1120). These two configurations are examples of widely-used TDD configs. In slot 3 (shown at 1130) and slot 8 (shown at 1140), config 1 has a scheduled uplink, while config 2 has a scheduled downlink, which creates a conflict if both configs are operating at the same time and visible to CBSDs. So, if the Enterprise Network is using UL/DL config 1 and if a neighboring network is using UL/DL config 2, then Enterprise Network CBSDs within the range of the neighboring network can experience a low UL SINR in SF3 (subframe 3) and SF8.

Calculation steps are described, which may be performed in any suitable processing system, such as in the Probe UE/BSAP, in the core network, or in an orchestrator.

It may be noted that TDD detection operations may be repeated across the set of allowed channels to determine the best channel(s) to support a BTS-CBSD, so that the required TDD configuration (DL centric or UL centric) can be supported. For example, in a CBRS deployment, the detection operations may be repeated across all 15 available channels. Note that these measurements can be performed from either or both of the UE/CPE-CBSDs and the BTS-CBSDs in the Enterprise Network.

(16) Detection of TDD Conflict Interference by Using UL SINR

Figure 12:
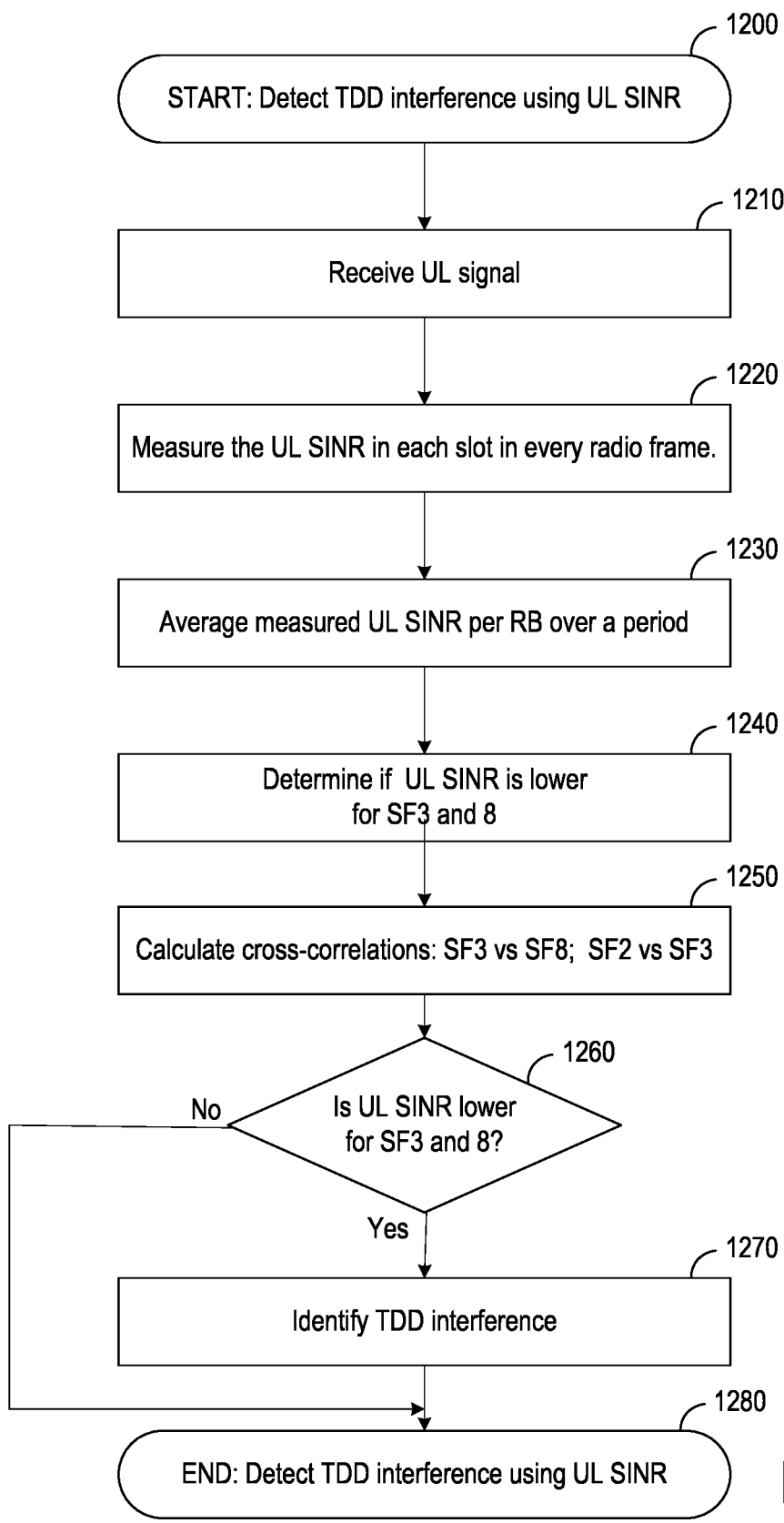
FIG. 12 is a flow chart of operations to detect TDD interference using UL-SINR measurements.

FIG. 12 is a flow chart of operations to detect TDD interference using UL-SINR measurements. Beginning at 1200, one embodiment of the method to identify TDD conflict interference detects the UL SINR in accordance with the following:

A BS/AP receives a UL signal (STEP 1210) and measures the UL SINR (STEP 1220) in each SF (slot) in every radio frame. The UL SINR is typically measured in a BS/AP, which may be a CAT-A BS/AP that has a built-in UE. Although SINR is typically measured at the BS/AP, and in some embodiments can be measured in a Probe UE.

Next, the measured SINR per Resource Block (RB) is averaged over a period. (STEP 1230).

Next, a determination is made as to whether the UL SINR in slots where there may be a conflict is lower than other non-conflict slots (STEP 1240). Particularly, if there is a UL/DL conflict between the Enterprise Network and a neighboring network, then the UL SINR for SF3 and SF8 should be lower, on average, over the measurement period than other slots. For a fixed UE and RB, the UL SINR cross correlation of SF3 and SF8 would be higher compared to the cross correlation of another slot (such as SF2) and SF3. Therefore, the existence of a conflict can be shown by calculating the cross correlation of SF3 vs SF8, and also the cross correlation of SF2 vs SF3, (STEP 1250) and comparing them (STEP 1260).

If from the cross-correlation comparison (STEP 1260) the UL SINR is sufficiently lower, then using these predictors, the Enterprise Network may be able to identify the TDD interference (STEP 1270) and determine the presence of a neighboring enterprise that is using a different UL/DL configuration, and creating interference. Operation to detect TDD interference using UL SINR then ends (STEP 1280).

The UL SINR TDD detection operations may be repeated for each frame across the set of allowed or available channels.

(17) Detection Using DL SINR

Figure 13:
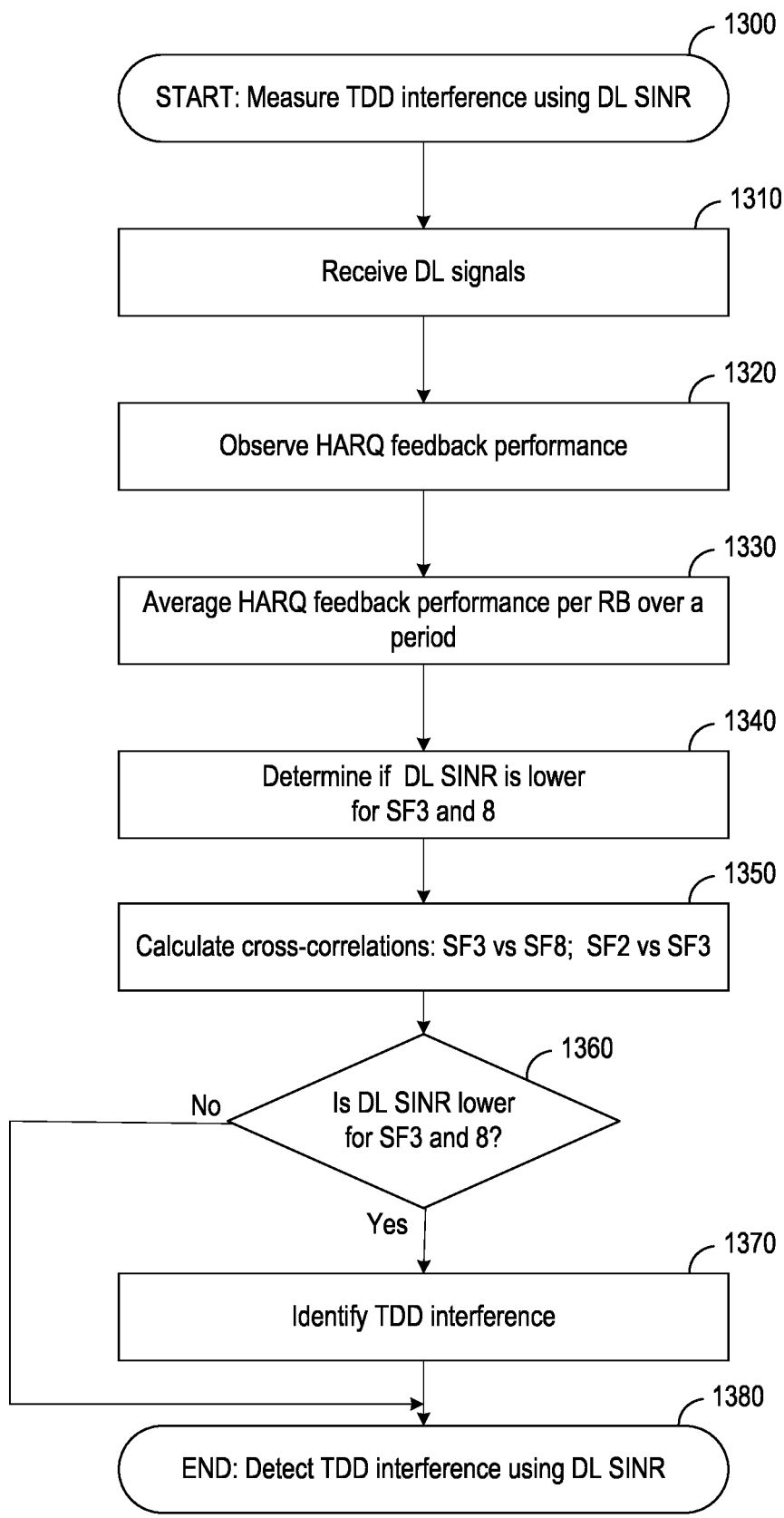
FIG. 13 is a flow chart of operations to detect TDD interference using HARQ feedback to make DL-SINR measurements.

FIG. 13 is a flow chart of operations to detect TDD interference using HARQ feedback to make DL-SINR measurements. Beginning at 1300, one embodiment of the method to identify TDD conflict interference operates in accordance with the following:

Since a BS/AP (or UE) cannot detect DL SINR directly, it can use HARQ feedback (which measures repeat requests) to determine the DL SINR for SF3 and SF8 and the other slots. A BS/AP receives DL signals (STEP 1310) and observes HARQ feedback (STEP 1320) in each SF (slot) in every radio frame. The DL SINR is typically measured in a BS/AP, which may be a CAT-A BS/AP that has a built-in UE. Although HARQ feedback is typically measured at the BS/AP, and in some embodiments can be measured in a Probe UE.

Next, the HARQ feedback performance per Resource Block (RB) is averaged over a period. (STEP 1330).

Next, a determination is made as to whether the DL SINR in slots where there may be a conflict is lower than other non-conflict slots (STEP 1340). Particularly, if there is a UL/DL conflict between the Enterprise Network and a neighboring network, then the DL SINR for SF3 and SF8 should be lower, on average, over the measurement period than other, non-conflict slots. For a fixed UE and RB, the DL SINR cross correlation of SF3 and SF8 would be higher compared to the cross correlation of another non-conflict slot (such as SF2) and SF3. Therefore, the existence of a conflict can be shown by calculating the cross correlation of SF3 vs SF8, and also the cross correlation of SF2 vs SF3, (STEP 1350) and comparing the cross-correlations (STEP 1360).

If from the cross-correlation comparison (STEP 1360) the DL SINR is sufficiently lower, then using these predictors, the Enterprise Network may be able to identify the TDD interference (STEP 1370) and determine the presence of a neighboring enterprise that is using a different UL/DL configuration, and creating interference. Operation to detect TDD interference using DL SINR then ends (STEP 1380).

Again, as in UL SINR, HARQ feedback performance for each SF is averaged over a period. Like UL, DL SINR metrics will be used to find cross-correlation across SF's.

The DL SINR TDD detection operations may be repeated for each frame across the set of allowed or available channels.

(18) Detect Using UL RSSI

Figure 14:
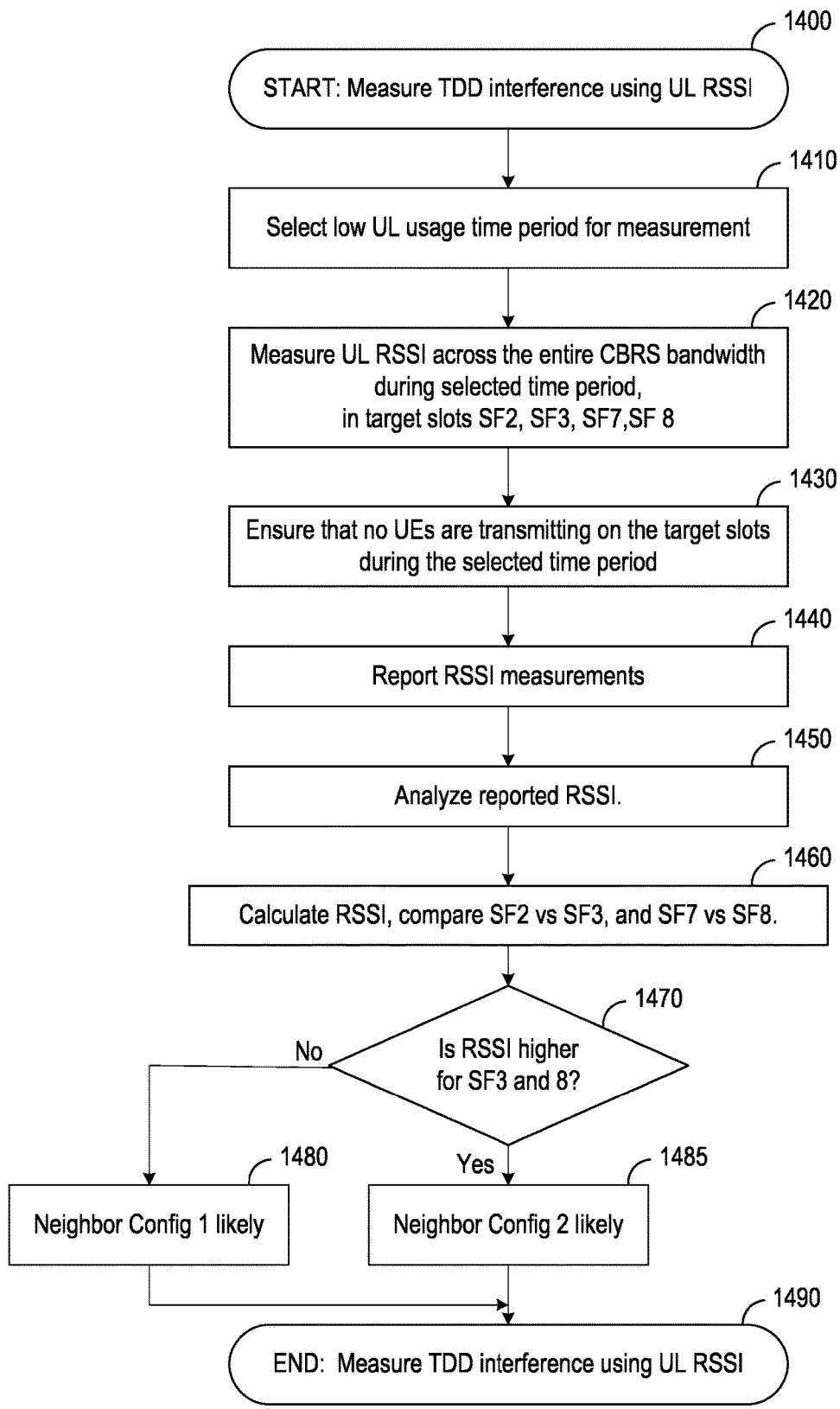
FIG. 14 is a flow chart of operations to detect TDD interference using UL-RSSI measurements.

A DL slot that is interfering with a UL slot can also be detected using the RSSI in the UL communications. FIG. 14 is a flow chart of operations to detect TDD interference using UL-RSSI measurements. Beginning at 1400, following is the method for detecting TDD interference using UL-RSSI:

Select a lean (low-usage) time period (e.g., midnight) to measure RSSI (STEP 1410). "Low usage" in this context means that there are fewer UL transmissions in the neighbor enterprise at that time.

Measure the UL RSSI across entire CBRS bandwidth during the selected measurement period (STEP 1420), in the times corresponding to target slots SF2, SF3, SF7 and SF8. In order to avoid measuring RSSI from UEs in the Enterprise Network in the target slots, the Enterprise Network ensures that UEs in the Enterprise Network are not transmitting on the target slots during the measurement period (STEP 1430). In one embodiment the Enterprise network can schedule a ghost UE (not tied to a specific UE) across entire bandwidth, which has the effect of preventing other UEs from transmitting during that period. Once it is "scheduled" that no UEs are transmitting on the target slots during the selected measurement period, the RSSI can be measured on that channel, which gives a raw RSSI. Scheduling is generally performed in the core network, and managed by the orchestrator. For example, the orchestrator can select and manage the measurement period, and analyze the results.

The RSSI measurements can now be reported, e.g., to the orchestrator, (STEP 1440) where they can be analyzed (STEP 1450). As part of the analysis, the RSSI values can be calculated for SF2, SF3, SF7, and SF8, and compared between slots SF2 and SF3, and between slots SF7 and SF8. (STEP 1460).

In order to determine if the measured RSSI in slots 3 and 8 is due to UL transmissions in the neighbor network and not due to DL transmission, the RSSI measurements are analyzed. If UL transmissions are not present, then there should not be much additional RSSI. However, if DL transmissions are present, then DL RSREs (downlink resource elements) are present, which would add a proportional value to the RSSI. The RSSI comparison is tested (STEP 1470), and if this proportion is same between SF2 and SF3 and between SF7 and SF8, then it is likely that config 1 is being used (STEP 1480), because SF2 and SF7 are uplink slots in both config 1 and config 2. However, if the RSSI is higher on SF3 and SF8 than in SF2 and SF7, then the probability of a neighbor with UL config 2 is higher (STEP 1480).

The above RSSI process can be repeated at a busy hour, which can provide a comparison between a low-usage time and the busy hour, for analysis.

Operations to measure TDD interference using UL RSSI are now complete (STEP 1490).

The UL RSSI TDD detection operations may be repeated for each frame across the set of allowed or available channels.

(19) Config Registration and Detection System

In a config registration and detection system (not shown), UEs can be opportunistically used to provide information regarding configurations being used by neighbors. In order to provide information for this config registration and detection system, each enterprise first registers its CBSD IDs and their respective geo-locations together with their CBRS IDs in a registry that may be provided by a third-party service "X". Also, each CBRS deployment registers the UL/DL config for a geo-location in a second registry. The first and second registries may be colocated in the same computer system, and may be maintained by the same third-party service X. In one embodiment, a CxM as defined in the CBRS standards can provide the third-party service X.

One algorithm to utilize this registered information to detect interference is as follows:

1. Choose one or more border UEs (i.e., UEs that are entering the deployed network) to do ECGI (EUTRA cell global identity) measurements. Advantageously, a UE entering the system will have better sensitivity to neighbor site signals and have a higher likelihood of decoding the SIBs from them. The likelihood of successfully scanning the neighbor network will be better than with a REM (Radio Environment Measurement) scan.
2. Among the 20 MHz, 15 MHz, 10 MHz, 5 MHz rasters, choose one using a random function outside the currently granted bandwidth, and scan the frequency for any PCIs present on it.
3. For all the PCIs reported on the frequency, choose one PCI using a uniform random function.
4. For a chosen PCI, the BS/AP will ask the UE to report the ECGI of the cell.

5. Once the ECGI is received, the BS/AP queries service X for the CBRS ID and geolocation.
6. Service X can find the geo-location from the BS/AP ID and get the UL/DL config from geo-location.
7. Service X can report the UL/DL config along with CBRS id of the neighbor.
8. Over a period, different UEs entering the system from different directions will report different PCIs for different frequency. Assuming the environment has slow rate of change and mostly static, the neighbor environment can be better estimated and the rate of usage for each UL/DL config can be obtained along with the signal power.

As an alternative to a BS/AP, a probe UE can also be utilized in this algorithm.

(20) Detecting Interference Using the PER (Packet Error Rate) in Specific Slots

One method of detecting interference using PER is as follows:
1. For select UEs, schedule the UL grants on slots that are likely to face interference from a neighboring CBSD operation:
The interference itself may stem from DL Tx from CBSD or due to crosslink interference due to a nearby UE;
These interferences will also happen only when there is DL/UL transmission that coincides with the PER detection is performed on specific slots.
2. The tests are performed during known peak times and repeated with multiple UEs and over several periods of time.
3. If there is consistent PER detected in e.g., the slots SF3 and SF8 (over adjoining slots), then this indicative of a potential conflict in the TDD configurations used in the deployed network and the neighbor network.
4. Check for PER measurements (at L2/L1) to see if there is a detectable increase relative to UE CQI/SRS/DMRS information.

(21) (ECGI,CSG)→CBSD ID's→SAS Enquiry for TDD Config

Currently, the CBSD-to-SAS interface provides information on the channel availability for a group of CBSDs as part of the ICG-based spectrum inquiry. The SAS also provides the channel quality associated with each CBSD for the available channels (it receives reported measurements and creates an environmental "map", that predicts the channel quality), based upon reported measurements. The SAS is also being integrated with the CxM functionality to support TDD configuration selection through majority voting amongst the CBSDs that are part of TCCS. The CBSDs may be allowed to use their 'Secondary TDD configuration' as long as it does not cause interference to the neighbors who are using the 'Primary TDD configuration'.

The CSAS (CxM+SAS) interface to the CBSD can also be enhanced to provide the TDD configuration used by the neighboring CBSDs so that a potential source of interference can be detected. The CSAS interface can be used to provide this. The EN can also provide TDD info to the CSAS.

(22) Probe UE Capabilities and Procedures

(23) Overview of a UE of Interest to Use as a Probe UE

The UE of interest will be a fixed device at a strategic location in an enterprise location. The UE may have installed software programs that provide a variety of functions such as supplying information to support the network and improving network operation. The UE may be able to do any of the following:
 Scan the environment (over time) for any change;
 Do sanity test (defined below) in the environment;
 Do a performance test (defined below) in the environment; and
 Perform a radio performance test (defined below).

(24) Scanning Environment Tests

Any of these tests can be implemented in a software package that can run on a Probe UE, to build the picture of the network RF environment, using data from the probe UE's perspective:
1. Check if there is any new neighboring enterprise (CBSD) that is radiating and report the radiated RSRP. (Reference Signal Received Power: a measurement of the received power level in a wireless network.)
2. Monitor SON power changes over time and determine the difference between the expected coverage and the achieved coverage. Note if the UE observes a significant difference between the expected coverage and achieved coverage. Raise an alarm if the SON algorithm change has resulted in HO (HandOver) failures or coverage holes.
3. Monitor the neighboring network(s) over a period of time and determine whether the RSRP of neighbors has changed, and if so, raise an alarm. (This could be items in the warehouse sort of environment). This alarm can be used, for example, as a trigger to switch on additional BS/APs or perform a new power allocation.
4. Offload ANR (Automatic Neighbor Relation) activity from other UEs (non-probe UEs) to the probe UE. If there is an environment change scan the environment and populate the ANR table in the BS/AP (useful if no other service is doing it).

(25) Network Performance Test Suite

A Network Performance test suite can be implemented in a software package that can run on the UE, coordinated between cloud application(s) and the UE. The network performance test suite monitors network performance, and has the purpose of providing useful information to the Enterprise Network that may lead to improved performance.
1) The performance suite might include test running ping, UL load, DL load, UL/DL load, UDP and TCP traffic for different QCI's and reporting the results and context to the enterprise management's cloud service.
2) During setup or reconfiguration, a network goes through a churn as it gets orchestrated, during which the network behaves differently, and performance may be affected until the network stabilizes. There is also the backhaul which can behave differently with time of day. These problems can be detected when there are enough UEs and loads on the system. Otherwise, it will be detected when the system gets loaded.

To avoid surprises, an enterprise can run these performance tests, at higher load, at different lean hour points in the day to collect relevant information from different load levels.
3) A machine learning service can detect a potential problem using the data collected from the probe UEs.

However, the theory can be tested by running specific tests using a UE of interest.

(26) Radio Performance Test Suite

1. The UE of interest can be used to perform radio/scheduler optimization:
   a) Schedule each PRB on the UL, and monitor the UL performance and check the SINR and the CRC errors (at the BS/AP), to estimate the performance of the PRBs.
   b) Schedule each PRB on the DL, and monitor the DL performance and check the HARQ (Hybrid Automatic Repeat Request) feedback at the BS/AP or UE.
   c) Use (a) and (b) for PRB ranking in the UL and DL.

We can seed the initial set of PRBs and transmission schemes for the UEs considered close to the UE of interest (by triangulation or other methods) using the PRB ranking. The PRBs rank can be used to schedule a critical QCI (higher rank) compared to noncritical one (use lower rank).

2. In a CA (Carrier Aggregation) enabled environment, both cells would not have a perfect overlap. (1) can be repeated for each cell and additionally cell can be ranked based on location based on their PRB average performance. A higher-ranked cell becomes the preferred PDSCH (Physical Downlink Shared Channel) candidate.

(27) Sanity Suite

A sanity suite can perform tests that can be periodically run on the UE (e.g., at the end of a day), coordinated between the cloud application and the UE. Sanity tests can include any of a number of techniques, and have the purpose of identifying network problems that may not have been identified using other techniques. For example, the sanity test may:
  1) The UE, through its application (may be with alternate radio (like WiFi), can report 1) reachability issues, 2) PCI's (Physical Cell Identifiers: quasi-unique identifiers) of the cells detected and their 3) respective powers (e.g., RSSI).
  2) Test: the network may configure different QCI's on the probe UE's and check if the QCI's are being achieved. If not, determine the difference, and if the network can correct, or further diagnosis is needed.
  3) Check if cells within the BS/AP are transmitting without much anomaly (significant variations between received and expected) in power.
  4) Check if there is PCI confusion/collision that is not detected. For example, two CBSDs (e.g., one in the home network, one in a neighboring network) might have the same PCI which would cause confusion if not detected and corrected.

(28) EN Implementation Diagram

FIG. 15 is a block diagram of an implementation of an Enterprise Network (EN) 1500 and a Cloud-Based Network Orchestration Module 1530. The EN 1500 includes one or more Radio Access Networks (RANs) 1510 each located on a separate campus location 400. Each RAN 1510 comprises a plurality of BS/APs 1506 that are wirelessly connected to a plurality of UEs 1512. The RANs 1510 are connected to an Operator Core Network 1520. A group of Probe UEs 902 (e.g., see 700 in FIG. 7) are situated on each campus location 400, and may be considered as part of the RAN.

In an enterprise network deployment, the BS/APs 1506 and elements of the RAN 1510 will be located on the campus locations 400, and it is very likely that the Core Network 1520 will be physically located at or near one or more of the enterprise locations, especially in large or multiple deployments in the same area. However, for smaller deployments, or for multiple small deployments, it may be more cost-effective to physically locate the Core Network remotely from the enterprise location.

The RANs 1510 are connected to the Operator Core Network 1520 by any suitable connection. For example, all the BS/APs 1506 in the RAN 1510 may be connected to the respective RAN by any appropriate communications means, such as wire, fiber optic, and wireless radio, which is then connected to the Core Network 1520.

The BS/APs in the RANs 1510 are connected to, and operated and controlled by, the Core Network 1520. Some of the RAN services may be provided by the Core Network 1520. The RANs 1510 provide wireless connections and services to a plurality of UEs on the campus locations 400. A user interface (not shown) may be provided and connected to the Core Network 1510 for administration of the EN 1500.

The Core Network 1520 (which may also be called a Programmable Service Edge or "PSE") provides a variety of services for the EN 1500 using a plurality of components connected to each other by any appropriate means. In the illustrated embodiment of FIG. 15, the Core Network 1520 includes an Automatic Configuration Server (ACS) 1521, a domain proxy 1522, an MMF (Mobility Management Function) unit 1523, an SGW/PGW (Serving Gateway/Packet Data Network Gateway) unit 1524, a Self Organizing Network (SON) unit 1525, a KPI (Key Performance Indicator) service unit 1526, an Operations, Administration, and Maintenance (OAM) Server 1527, and units for other services.

The Core Network 1520 may be connected to a Spectrum Management Entity (SME) 1550 and a Coexistence Manager (CxM) 1552.

The Core Network 1520 is connected to the Network Orchestration module 1530 by any appropriate communications means, such as a PDN 1504. Generally, the Network Orchestration Module 1530 supports the Core Network 1520 and can provide additional services. The Network Orchestration Module 1530 may include an Administrative Service Unit 1532 for remote administration of the Enterprise Network. The Network Orchestration Module 1530 also includes databases 1534, a Measurement Processing Unit 1536 that receives and processes measurements from the Probe UEs, a TDD Interference Detection Unit 1538 that manages TDD detection, receives processed measurements and detects TDD configurations of neighbor networks. The Network Orchestration Module 1530 may also include a Machine Learning Unit 1540, an Artificial Intelligence unit 1542, and other components as may be necessary or useful to support its functions.

(29) Programmable Embodiments

Some or all aspects of the invention may be implemented in hardware or software, or a combination of both (e.g., programmable logic arrays). Unless otherwise specified, the algorithms included as part of the invention are not inherently related to any particular computer or other apparatus. In particular, various general purpose computing machines may be used with programs written in accordance with the teachings herein, or it may be more convenient to use a special purpose computer or special-purpose hardware (such as integrated circuits) to perform particular functions. Thus, embodiments of the invention may be implemented in one or more computer programs (i.e., a set of instructions or codes) executing on one or more programmed or programmable computer systems (which may be of various architectures, such as distributed, client/server, or grid) each comprising at least one processor, at least one data storage system (which may include volatile and non-volatile memory and/or storage elements), at least one input device or port, and at least one output device or port. Program instructions or code may be applied to input data to perform the functions described in this disclosure and generate output information. The output information may be applied to one or more output devices in known fashion.

Each such computer program may be implemented in any desired computer language (including machine, assembly, or high-level procedural, logical, or object-oriented programming languages) to communicate with a computer system, and may be implemented in a distributed manner in which different parts of the computation specified by the software are performed by different computers or processors. In any case, the computer language may be a compiled or interpreted language. Computer programs implementing some or all of the invention may form one or more modules of a larger program or system of programs. Some or all of the elements of the computer program can be implemented as data structures stored in a computer readable medium or other organized data conforming to a data model stored in a data repository.

Each such computer program may be stored on or downloaded to (for example, by being encoded in a propagated signal and delivered over a communication medium such as a network) a tangible, non-transitory storage media or device (e.g., solid state memory media or devices, or magnetic or optical media) for a period of time (e.g., the time between refresh periods of a dynamic memory device, such as a dynamic RAM, or semi-permanently or permanently), the storage media or device being readable by a general or special purpose programmable computer or processor for configuring and operating the computer or processor when the storage media or device is read by the computer or processor to perform the procedures described above. The inventive system may also be considered to be implemented as a non-transitory computer-readable storage medium, configured with a computer program, where the storage medium so configured causes a computer or processor to operate in a specific or predefined manner to perform the functions described in this disclosure.

(30) Embodiments and Description

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion. Although the disclosed method and apparatus is described above in terms of various examples of embodiments and implementations, it should be understood that the particular features, aspects, and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A probe device for measuring TDD (Time Division Duplex) interference in an Enterprise Network (EN) that has a plurality of BS/APs (Base Stations/Access Points) situated on an EN campus and utilizing a first TDD configuration for wireless communications, the probe device positioned in the EN campus for measuring TDD interference between a neighboring wireless network that utilizes a second TDD configuration that may conflict with the first TDD configuration, the EN including an orchestrator to determine whether the second TDD configuration conflicts with the first TDD configuration, based on SIB (System Information Block) information of the neighboring wireless network therein determining whether there is TDD interference, comprising:
  a wireless receiver for receiving wireless channels;
  a frequency scanning unit;
  data storage; and
  a TDD measurement unit for measuring TDD interference data from the neighboring network, and providing the data to the Enterprise Network over the communication link, wherein the TDD measurement unit includes an SIB Measurement unit for receiving broadcast SIBs signals from the neighboring wireless networks; and
  a communication link with the Enterprise Network to contact the EN and send SIB information to the EN, to determine, via the orchestrator, whether there is TDD interference.

2. The probe device of claim 1 wherein the TDD measurement unit includes a UL (Upload) SINR (Signal to Interference plus Noise Ratio) Measurement Unit.

3. The probe device of claim 1 wherein the TDD measurement unit includes a DL (Download) SINR (Signal to Interference plus Noise Ratio) Measurement Unit.

4. The probe device of claim 1 wherein the TDD measurement unit includes an UL (Upload) RSSI (Received Signal Strength Indicator) Measurement Unit.

5. The probe device of claim 1 wherein the probe device is positioned in a fixed location in an Enterprise Network campus.

6. The probe device of claim 1 wherein the probe device is mobile in an Enterprise Network campus.

7. The probe device of claim 1 wherein the wireless receiver has circuitry for receiving CBRS (Citizen's Broadband Radio Service) channels and the frequency scanning unit has circuitry for scanning CBRS channels.

8. The probe device of claim 7 wherein the wireless receiver has circuitry for receiving signals in adjacent bands, including at least one of mid-band signals and C-band signals.

9. The probe device of claim 1 wherein the probe device is a CBSD (Citizens Broadband Radio Service Devices) that has a built-in UE (User Equipment).

10. The probe device of claim 1 further comprising circuitry for performing RF environment scanning, Network Performance testing, and Radio Performance testing.

11. In an Enterprise Network (EN) campus location that utilizes a TDD (Time Division Duplex) configuration, a method of detecting interference from a neighboring wireless network, comprising:
  providing a probe device;
  positioning the probe device in the EN campus where it can receive signals from the neighboring network;
  receiving signals from the neighboring network in the probe device, which includes an SIB; and
  determining the TDD configuration utilized by the neighboring network, wherein the determining of the TDD configuration of the neighboring network includes receiving neighbor SIBs (System Information Blocks) from the neighboring network in the probe device, and determining whether there is TDD interference based on the TDD configuration utilized by the neighboring network.

12. The method of claim 11 wherein determining the TDD configuration of the neighboring network includes measuring communication data in slots where TDD interference can occur between different TDD configurations.

13. The method of claim 12 wherein determining the TDD configuration of the neighboring network includes measuring UL (Upload) SINR (Signal to Interference plus Noise Ratio) in the probe device.

14. The method of claim 13 further comprising calculating cross-correlation between two slots and determining TDD interference responsive to the cross-correlation.

15. The method of claim 12 wherein determining the TDD configuration of the neighboring network includes measuring DL (Download) SINR (Signal to Interference plus Noise Ratio) in the probe device.

16. The method of claim 15 wherein measuring the DL SINR includes observing the HARQ (Hybrid Automatic Repeat Request) feedback performance.

17. The method of claim 12 wherein the probe device is a BS/AP (Base Station/Access Point), and determining the TDD configuration of the neighboring network includes measuring UL (Upload) RSSI (Received Signal Strength Indicator) in the probe device.

18. The method of claim 17 further comprising comparing the RSSI between two slots.

19. A probe device for measuring TDD (Time Division Duplex) interference in a wireless CBRS (Citizen's Broadband Radio Service) Enterprise Network (EN) that has a plurality of CBSDs (Citizens Broadband Radio Service Devices) situated on an EN campus and utilizing a first TDD configuration for wireless communications on the EN campus, a probe device positioned in the EN campus measuring TDD interference between a neighboring wireless network that utilizes a second TDD configuration that has at least one slot that conflicts with the first TDD configuration, the EN connected to an Orchestrator to determine whether there is TDD interference based on SIB information, comprising:
  a wireless receiver for receiving wireless CBRS channels;
  a frequency scanning unit for scanning CBRS channels;
  a TDD measurement unit for measuring TDD interference data from the neighboring network, including at least one of: an SIB (System Information Blocks) Measurement unit for receiving broadcast SIBs signals from neighboring networks, a UL (Upload) SINR (Signal to Interference plus Noise Ratio) Measurement Unit, a DL (Download) SINR Measurement Unit, and a UL (Upload) RSSI (Received Signal Strength Indicator) Measurement Unit; and
  a communication link with the Enterprise Network and the Orchestrator to send the SIB information to the Enterprise Network to determine whether there is TDD interference.

* * * * *